US012640623B2

(12) United States Patent
Colt et al.

(10) Patent No.: US 12,640,623 B2
(45) Date of Patent: May 26, 2026

(54) WELL-BASED POTENTIAL ENERGY CONVERSION SYSTEMS AND METHODS FEATURING WELL-EXTERNAL SENSING

(71) Applicant: RENEWELL ENERGY, Houston, TX (US)

(72) Inventors: Walker Rowley Colt, Houston, TX (US); Anthony Kemp Gregory, Jr., Houston, TX (US); Stefan James Streckfus, Denver, CO (US); Aaron Munoz, San Luis Obispo, CA (US)

(73) Assignee: RENEWELL ENERGY, Houston, TX (US)

( * ) Notice: Subject to any disclaimer, the term of this patent is extended or adjusted under 35 U.S.C. 154(b) by 248 days.

(21) Appl. No.: 18/590,054

(22) Filed: Feb. 28, 2024

(65) Prior Publication Data

US 2024/0258878 A1    Aug. 1, 2024

Related U.S. Application Data

(60) Provisional application No. 63/479,443, filed on Jan. 11, 2023.

(51) Int. Cl.
| | |
|---|---|
| *E21B 43/34* | (2006.01) |
| *F03G 3/00* | (2006.01) |
| *H02K 7/18* | (2006.01) |

(52) U.S. Cl.
CPC ........... *H02K 7/1853* (2013.01); *F03G 3/087* (2021.08)

(58) Field of Classification Search
CPC ............ E21B 43/34; E21B 21/04; C09K 8/34
USPC ...................................................... 166/305.1
See application file for complete search history.

(56) References Cited

U.S. PATENT DOCUMENTS

| | | | | |
|---|---|---|---|---|
| 10,001,769 | B2 * | 6/2018 | Huang | E21B 43/26 |
| 11,834,329 | B2 * | 12/2023 | Sansa Perna | G02F 1/0123 |
| 2003/0192693 | A1 * | 10/2003 | Wellington | E21B 41/0064 |
| | | | | 166/267 |
| 2011/0241356 | A1 * | 10/2011 | Khoshnevis | F03G 3/00 |
| | | | | 290/1 R |
| 2022/0333825 | A1 * | 10/2022 | Hanback | E21B 7/007 |

FOREIGN PATENT DOCUMENTS

GB          2499007 A  *  8/2013  ............... F03D 9/14

* cited by examiner

*Primary Examiner* — William D Hutton, Jr.
*Assistant Examiner* — Ashish K Varma
(74) *Attorney, Agent, or Firm* — Vorys, Sater, Seymour and Pease, LLP

(57)          ABSTRACT

Potential energy conversion systems include a movable mass suspended by a line in a non-producing well, in which the line is coupled to a motor operable to lift the movable mass and a generator operable to produce electricity when lowering the movable mass. A fluid fills at least a portion of the non-producing well, and a volume of the fluid is sufficient to immerse or fully immerse the movable mass when the movable mass is raised to an uppermost position in the non-producing well. A storage tank is configured to receive fluid displaced from the non-producing well as the movable mass is lowered from a higher location to a lower location in the non-producing well and to return the fluid to the non-producing well as the movable mass is raised from the lower location.

21 Claims, 13 Drawing Sheets

200

900

906

904

942

902

943

903

1000

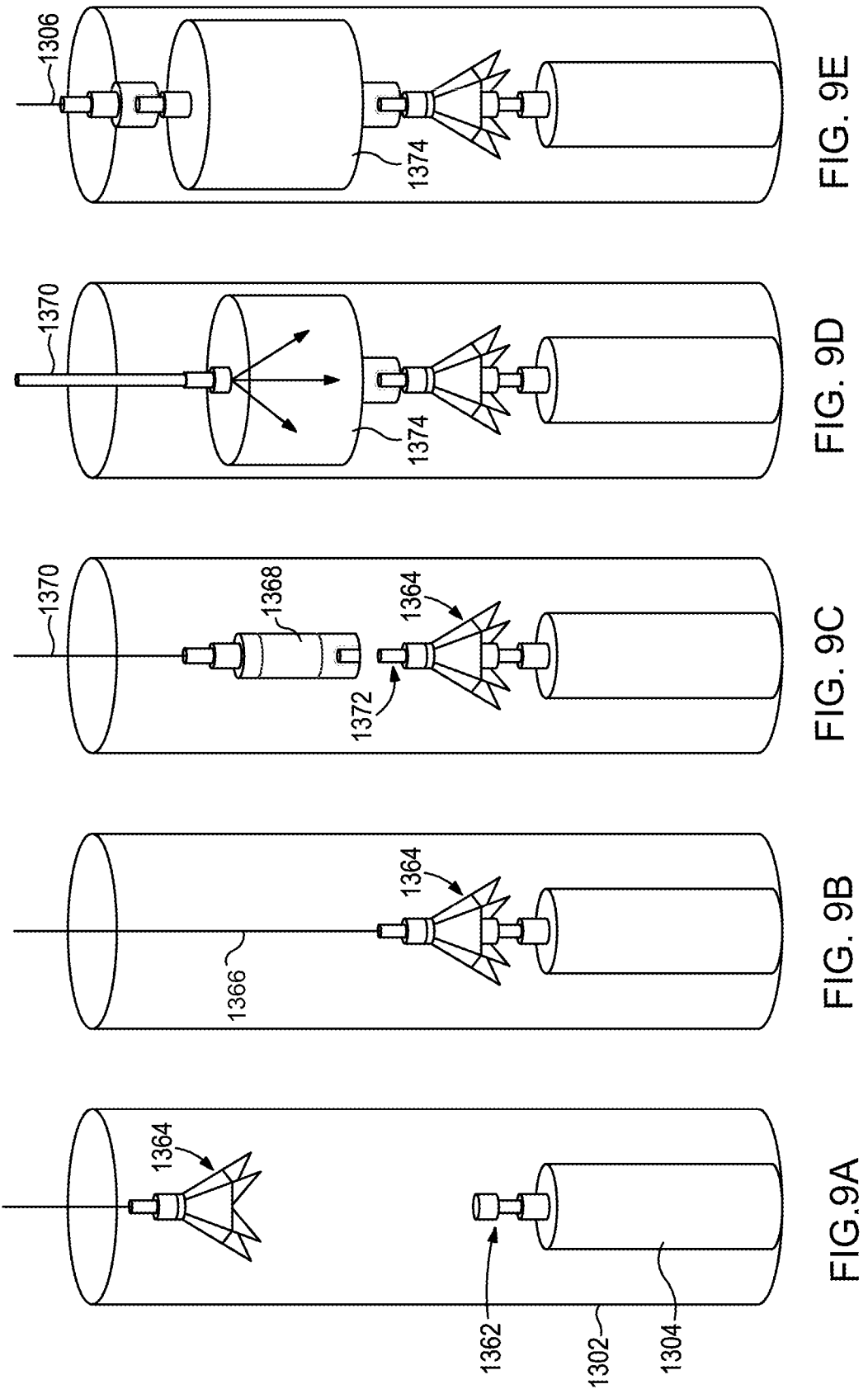

WELL-BASED POTENTIAL ENERGY CONVERSION SYSTEMS AND METHODS FEATURING WELL-EXTERNAL SENSING

STATEMENT REGARDING FEDERALLY SPONSORED RESEARCH AND DEVELOPMENT

This invention was made with government support under contract DE-AR0001546 awarded by U.S. Department of Energy. The government has certain rights in the invention.

FIELD

The present disclosure relates to potential energy conversion and, more particularly, systems and methods operable to produce electrical power through release of potential energy using a gravity-based system.

BACKGROUND

According to the U.S. Energy Information Administration, in 2019 the total energy generation from wind and solar resources was a collective 8% of all energy generated. Due to the intermittent nature of wind and solar power generation, these sources are unreliable for consistent power generation. By themselves, these power sources are unable to produce electricity in lockstep with demand, unlike other energy sources such as natural gas, nuclear, or coal power, which have fewer condition-based operational constraints. As a result, there has been growing demand for energy storage technologies to harness renewable and other intermittent energy sources in times of excess production capacity and release the stored energy when there is excess demand or production capacity is low.

Batteries and supercapacitors are increasingly being used for storage of excess energy. However, these technologies may be expensive, particularly when employed for storage of massive amounts of electricity.

One approach that has been long-used for storing energy on a large scale utilizes a water reservoir for pumped-storage hydroelectricity ("Pumped Hydro"). In Pumped Hydro approaches, the potential energy of water is increased by pumping it into a reservoir at a first elevation and discharging it to a lower elevation through a series of turbines to produce electric power. Pumped Hydro approaches may operate efficiently, with the loss between energy input and recovered energy output below about 30% in most modern systems (i.e., greater than about 70% energy recovery). A main advantage of Pumped Hydro approaches is that little infrastructure may be needed, as natural features can provide the reservoir and elevation difference. However, to provide adequate energy storage, large volumes of water are typically required to account for the modest difference in elevation between the top of the reservoir and the power generation location at a lower elevation, typically no more than hundreds of feet and often less. Further, installation and operation of Pumped Hydro facilities are becoming increasingly hindered by environmental regulations, as the large volumes of water may be stored in previously dry areas and affect wildlife and local water flow. As a result, relatively few Pumped Hydro facilities have been installed in recent years.

Gravity-based potential energy storage is also a feasible approach for mitigating intermittent power generation. In such energy storage systems, a mass is suspended and electrical power is input to mechanically elevate the mass to a higher elevation when excess power is available. The stored potential energy is then converted back to electricity in response to demand by lowering the mass and driving a mechanical generator. Using modern winches and generators, gravity-based systems can achieve high storage efficiency, with losses often below about 20%. Gravity-based systems are often less susceptible to the environmental impact and government regulations associated with Pumped Hydro approaches, but may require installation and maintenance of expensive infrastructure. For example, gravity-based systems may require construction of a tower or pit to provide the difference in elevation for raising and lowering a movable mass. As the elevation difference increases to afford more energy storage capacity, construction/infrastructure costs may increase as well. The combined effects of large initial capital expenditure and unsightly visual impacts can render gravity-based systems impractical and uneconomical in some cases. Suspension of increasingly larger masses may improve the storage potential, but this approach may face limits as well.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

FIGS. 9A-9E are diagrams of various views of a recovery system for retrieving a movable mass from a well housing a potential energy conversion system.

DETAILED DESCRIPTION

Figure 1A:
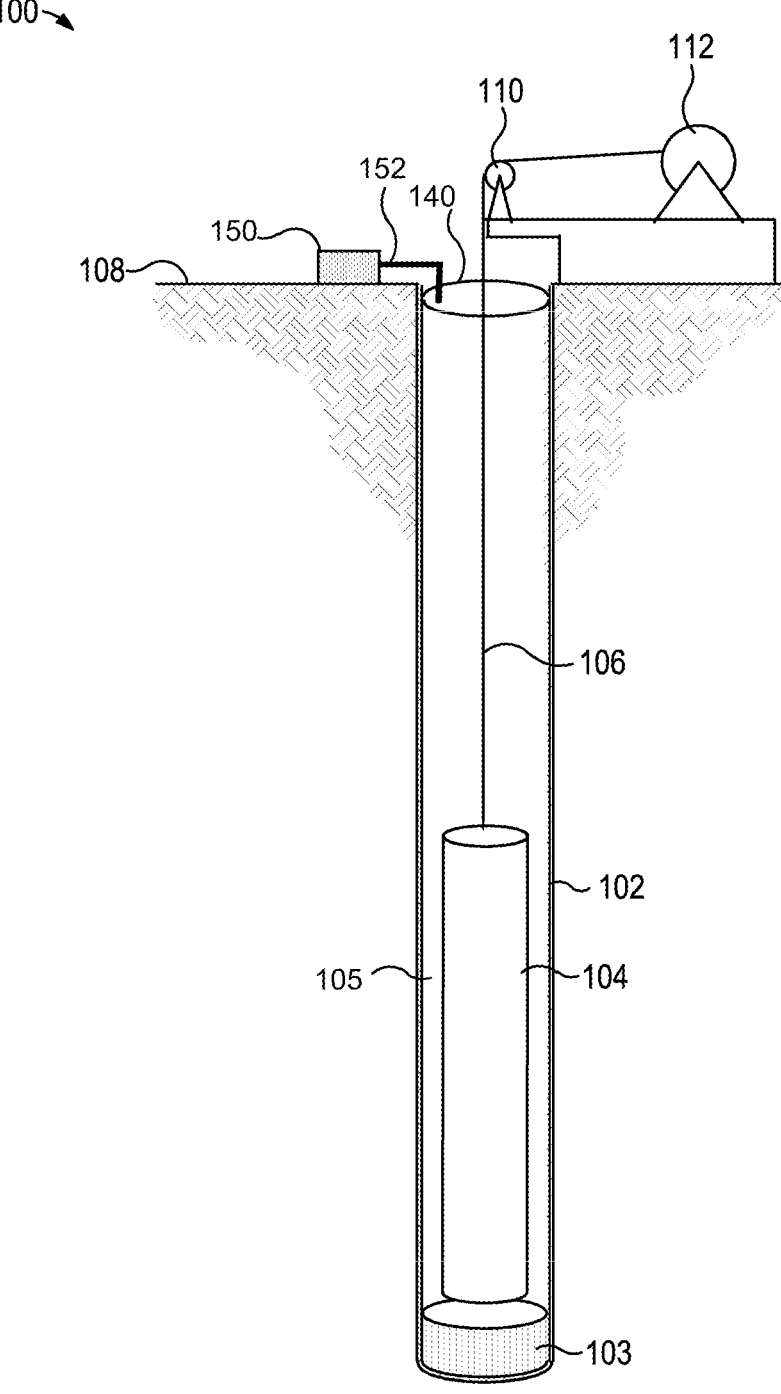
FIGS. 1A and 1B are diagrams of a potential energy conversion system of the present disclosure housed in a non-producing well in discharged and charged positions, respectively.

The present disclosure relates to potential energy conversion and, more particularly, systems and methods operable to produce electrical power through release of potential energy using a gravity-based system.

As discussed above, excess energy produced from various power sources can be stored in the form of potential energy. However, there are limitations to Pumped Hydro and conventional gravity-based potential energy storage approaches.

The present disclosure provides energy storage approaches that maintain the advantages of gravity-based potential energy storage of energy produced from other sources, such as solar and wind energy sources, while also overcoming the challenges of providing large elevation changes to promote utilization of smaller masses, for example. Namely, the present disclosure provides potential energy storage and conversion systems (referred to herein as "potential energy conversion systems") that utilize existing infrastructure in the form of inactive (idle) and/or abandoned wellbores that are no longer producing a natural resource (e.g., a hydrocarbon resource or water) to house a movable mass within their production casings for the purposes of storing and releasing potential energy as a movable mass travels up and down therein. Essentially, the movable mass and its associated infrastructure function as a battery for storing energy in times of production exceeding demand and releasing the stored energy once demand exists and the stored energy needs to be released (e.g., to an electrical grid). In some cases, the energy may be stored in times when energy production costs are low and may be subsequently released at times of high demand when energy costs are higher Following drilling completions, wells may include a narrow casing extending thousands of feet into the earth (e.g., a nine-inch diameter casing extending up to 15000 feet or even further below ground). The large vertical distance may be exploited in the present disclosure for providing a substantial elevation change of a movable mass in gravity-based potential energy conversion systems disclosed herein. Both cased and uncased wells may be utilized in this manner. By retrofitting a non-producing well with a potential energy conversion system according to the disclosure herein, an essentially distressed asset (i.e., the non-producing well) may be converted into a revenue source with minimal capital input. Environmental advantages may be realized in some instances, as also discussed herein.

Potential energy conversion systems housed in a non-producing well, as disclosed herein, may provide a number of advantages over existing potential energy conversion systems. One advantage is that the non-producing wells may be retrofitted to afford potential energy storage with little additional infrastructure investment. The main infrastructure investment associated with a well is already borne by the entity that drilled the well with the goal of producing a natural resource therefrom. Thus, the potential energy conversion systems disclosed herein may utilize this existing infrastructure (which may be nearly worthless or even a financial liability once a well becomes non-producing) to add new value thereto. Advantageously, utilizing an abandoned, non-producing well may turn a nuisance asset into an environmentally friendly and socially positive energy storage resource that may facilitate use of clean energy production technologies, such as solar and wind power. According to Enverus, an online database which tracks oil and gas well information, there are about 1,380,000 inactive and unplugged wells across the United States alone, making up about 40% of all wells. As such, there is a large inventory of non-producing wells available for conversion into potential energy conversion systems according to the disclosure herein. Moreover, because many of these wells are unplugged, they may be emitting greenhouse gases (e.g., methane) into the atmosphere. However, there is limited financial motivation at present to plug these wells to stem the flow of greenhouse gases therefrom.

The potential energy conversion systems disclosed herein may be applicable to both cased and uncased wells, as well as those that are plugged or unplugged. Plugged wells may be desirable due to their lower release rate for methane and other greenhouse gases in comparison to unplugged wells (up to 5000 times less leakage). At the very least, incorporating a potential energy conversion system into an unplugged well may lessen the overall environmental impact of the well by counterbalancing a portion of the impact of the greenhouse gases released therefrom with a green energy storage technology. Even more desirably, retrofitting an unplugged, non-producing well for potential energy storage according to the disclosure herein may provide an economic impetus (incentive) for plugging the well during installation of the potential energy conversion system. Thus, a further advantage of the potential energy conversion systems disclosed herein includes a dual benefit in the reduction in methane leakage with an associated positive environmental impact through an increase in "green" energy storage capacity.

In addition to providing an economic impetus for plugging a well, there may be further benefits afforded by installing a plug in a well in which a potential energy conversion system is also to be installed. In particular, the plug may aid in retaining a fluid within an interval of the wellbore over which the movable mass travels. At the very least, a fluid maintained in the upper section of a well may provide hydrostatic pressure to limit the release of greenhouse gases therefrom and promote lubrication of the interface between the movable mass and the walls of the well (cased or not), particularly if there is a risk of incidental contact or known incidental contact between the walls of the well and the movable mass. Moreover, the fluid may provide buoyancy as the movable mass is raised and lowered in the wellbore, thereby helping to temper the rate of movement therein, rather than solely relying on a motor raising and lowering the movable mass to set a rate of movement. Using a motor alone to regulate the rate of movement of the movable mass may increase wear and tear on the motor, and more complex operating procedures, such as advanced software controls to regulate a release rate for stored electrical power, may be needed in some cases.

In the present disclosure, the movable mass of the potential energy conversion systems may remain at least partially immersed, preferably fully immersed, in a fluid as the movable mass travels up and down in a wellbore. By maintaining the movable mass fully immersed at all times, one may avoid buoyancy changes as increasing/decreasing proportions of the movable mass enter or leave the fluid. To maximize the amount of potential energy that may be stored and released by the potential energy conversion systems, the movable mass may be raised to or near the top of the well when in a charged position. In turn, to maintain the entirety of the movable mass within the fluid during operation, the fluid may similarly fill the well to or near the top of the well. That is, the fluid may be at least at a level higher than an uppermost position of the movable mass in the non-producing well. A desired amount of the fluid may be introduced into the well by an operator of the potential energy conversion systems in order to accomplish this outcome.

A difficulty with filling the well to or near capacity with a fluid (e.g., to maintain constant buoyancy of the movable mass as the movable mass is raised to higher locations in the well) is that the fluid may overflow from the well during operation of the potential energy conversion systems. Specifically, a cable (line) lowering the movable mass into the well, given the great depths to which the movable mass is lowered, may introduce sufficient volume into the well to displace a significant quantity of the fluid to a location outside the well (e.g., spillover). In the case of a small annulus between the movable mass and the walls of the well (or a casing in the instance of a cased well), the loss of fluid may result in all or a significant portion of the movable mass no longer being immersed in the fluid once the movable mass is again raised to its uppermost position in the well. The resulting variance in buoyancy may be problematic for reliable operation of the potential energy conversion systems due to an effective change in weight of the movable mass during operation. The change in effective weight of the movable mass may impart increased tension on the supporting wire and increase torque on the drive train of a winch or motor that raises or lowers the movable mass.

One manner in which the foregoing issue may be addressed is simply to add fluid to the well as the movable mass is raised and free volume is created in the well after completing a round trip. However, this approach is inefficient in terms of fluid use and may be technically complex. As an alternative and more favorable solution, the present disclosure captures the displaced fluid in a storage tank (trip tank) when lowering the movable mass in the well, and the displaced fluid is then reintroduced from the storage tank while raising the movable mass. Excess fluid may be optionally present in at least the line leading to the storage tank from the well and optionally in the storage tank itself. That is, when the movable mass is raised to its uppermost position in the well and the amount of fluid in the storage tank is at its minimum, optionally at least the line leading to the storage tank and optionally the storage tank itself may contain some fluid. By providing an excess of fluid beyond that needed to fill the well to a desired level, a margin of error may be created to ensure that the well remains filled with fluid, even should incidental fluid losses occur during operation of the potential energy conversion systems disclosed herein. The amount of excess volume of the fluid may be limited to keep the storage tank from overflowing when fully lowering the movable mass into the well. In other embodiments, however, the amount of fluid in the well may be sufficient to just immerse the movable mass when the movable mass is at its uppermost position, leaving the storage tank and the line leading to the storage tank empty until the movable mass is lowered into a deeper (lower) position within the well.

In addition to the advantages of repurposing an existing, non-producing well, the potential energy conversion systems of the present disclosure may incorporate further features that may facilitate potential energy storage within a wellbore environment. The conditions in a well may change over time, even in a plugged well (e.g., if the plug or casing degrades or fails, or if the fluid introduced into the well to provide buoyancy degrades or becomes contaminated), regardless of whether a potential energy conversion system is present therein. The potential energy conversion systems of the present disclosure may incorporate sensors configured to monitor the wellbore environment and substances present therein (e.g., liquids and/or gases in the well, or mechanical properties within the well). By monitoring conditions in a non-producing well, such as composition and/or hydrostatic pressure, one may determine if the non-producing well itself has undergone a dynamic change or if the potential energy conversion system has caused a change in the non-producing well (e.g., by impacting a plug or casing therein). Changes within the non-producing well may alter the operating performance or status of the potential energy conversion systems in some cases. Therefore, monitoring conditions in the non-producing well may be utilized to assess how well the potential energy conversion systems are operating. In some instances, monitoring of the conditions within the non-producing well may be performed directly using one or more sensors within the well environment itself. In other instances, monitoring may take place external to the non-producing well, such as in a wellhead, storage tank, a line leading to the storage tank, upon a sheave pulley system, or even sensors located in proximity to the non-producing well (e.g., on the earth's surface).

In addition to direct monitoring within a non-producing well, the displaced fluid in the systems and methods of the present disclosure affords another convenient location for assessing conditions within the non-producing well to provide an alert that an operator may need to be aware of. Monitoring the displaced fluid in a storage tank (or the head space above the displaced fluid in the storage tank) and/or lines leading from the wellhead to the storage tank, may provide a robust indication of the conditions within the non-producing well, given that the fluid is received directly from the well itself. Direct monitoring of the displaced fluid (or the head space above the displaced fluid) may be particularly advantageous if a specialized fluid has been introduced to the non-producing well to facilitate movement of the movable mass therein (e.g., to protect the movable mass against corrosion, to provide low-friction movement through the well, and/or to promote a desired buoyancy), and compositional changes within the fluid would diminish one or more of the desirable features of the fluid. Changes in composition of the fluid may be indicative of incursion of hydrocarbon gases (e.g., methane) or acid gases (e.g., carbon dioxide or hydrogen sulfide) into the well due to plug or casing failure. Pressure changes within the head space above the fluid may also be indicative of abnormal conditions within the well. Any of the foregoing conditions may impact operating efficiency of the potential energy conversion system, which may change the amount of electrical power stored or discharged to an electrical grid, for example.

In still another alternative, hydrostatic pressure within the storage tank or a line leading to the storage tank may be measured using a submerged sensor to determine the depth of the fluid within the tank. The tank may be sealed or unsealed (open to the atmosphere) when only measuring hydrostatic pressure of the displaced fluid. By measuring the depth of the displaced fluid within the tank, the volume of displaced fluid may be ascertained in real-time or near real-time based upon the known geometry of the storage tank. The displaced fluid volume, in turn, may be utilized as an indirect measure of the depth of the movable mass in the non-producing well. For example, the change in the amount of displaced fluid within the storage tank may be indicative of the distance that the movable mass has been lowered within the well, given that the displaced volume varies with the length of cable (line) that lowers the movable mass into the well. A hydrostatic pressure out of a specified range for a given depth or volume of fluid within the storage tank may be indicative of abnormal conditions within the well that have changed the fluid in some way. Alternately, if the hydrostatic pressure is greater than or less than an expected range, the pressure variance may be indicative of fluid incursion into or fluid loss from the well, respectively, either of which may alter the operating efficiency of the potential energy conversion system.

Still other locations are possible for monitoring the conditions present within a non-producing well, especially in the case when all or a significant portion of the well, or an interval thereof, is filled with a fluid. In particular, it may be more advantageous to conduct sensing of hydrocarbon gases external to the well using conventional gas sensors external to the well rather than conducting liquid-based sensing inside the well itself. Conventional sensors that may be deployed external to the well include, for example, point sensors (typically employing a metal oxide sensing element), open path sensors employing lasers, or infrared imaging techniques. Locations external to the well that may be monitored in accordance with the foregoing include, but are not limited to, the headspace of the storage tank (trip tank), a location below a fill line in the storage tank (i.e., submerged within the storage tank), within a wellhead sealing a surface opening of the well (e.g., within a blowout preventer placed over the surface opening of the well), upon a sheave pulley system facilitating introduction of the movable mass to the well, or the like. In addition, one or more gas sensors may be deployed in a field containing multiple potential energy conversion systems to facilitate monitoring of a plurality of wells simultaneously. Additional details regarding sensor placement external to the well environment are provided below.

In addition to the foregoing features, the potential energy conversion systems may incorporate one or more failsafe devices that are configured to protect the plug in a plugged well should the movable mass drop uncontrollably or break free of a line tethering the movable mass. The failsafe features may arrest the impact at the plug through various types of interactions discussed further herein. As a further option, the potential energy conversion systems may incorporate capabilities for recovering a movable mass that has become uncoupled in a well.

The terms "mass" and "movable mass" may be used interchangeably herein. The term "suspended mass" may also be used equivalently herein.

Potential energy conversion systems of the present disclosure are gravity-based systems that operate by storing or releasing potential energy through vertical movement of a mass suspended within a well, such as a non-producing well. The potential energy conversion systems may convert electricity to potential energy as the movable mass is raised, and the potential energy may be converted back to electricity as the movable mass is lowered. In non-limiting examples, the movable mass may be raised in times of excess energy production, and electricity may be generated by lowering the movable mass when excess energy production capacity is needed. The amount of potential energy storable by the potential energy conversion systems, and the efficiency thereof, may be defined by a number of factors that include the depth and width of the well; the weight of the movable mass; the presence of deviations, inclinations, or doglegs within the well; and the properties of a fluid through which the movable mass translates within the well. The fluid may fill the well and/or at least partially immerse, preferably fully immerse, the movable mass when the movable mass is raised to an uppermost position in the well. The fluid may provide a consistent buoyancy as the movable mass is lowered through the well, in addition to providing other advantages discussed herein. The well housing the potential energy conversion system may be open-hole, or the well may be capped with a wellhead, such as a blowout preventer, for example.

The potential energy conversion systems may be incorporated within any well extending below the earth's surface.

While the potential energy conversion systems may be located within a well of any depth, the well depth may more desirably be about 5000 feet or more, or about 10000 feet or more, or about 15000 feet or more, or about 20000 feet or more, or about 25000 feet or more. Exemplary ranges include depths within a range of about 5000 feet to about 25000 feet, or about 5000 feet to about 15000 feet, or about 1000 feet to about 10000 feet, or about 10000 feet to about 20000 feet. The mass may be located in a substantially vertical section of the well extending over these vertical distances, such as between a wellhead at the earth's surface and a plug located at a specified depth within the well. The plug may divide the well into upper and lower sections. The movable mass may transit the upper section of the wellbore when storing and releasing potential energy according to the disclosure herein. The upper section may contain a fluid through which the movable mass transits when storing and releasing potential energy according to the disclosure herein, and preferably, the upper section contains sufficient fluid such that the movable mass is at least partially immersed, preferably fully immersed, in the fluid when the movable mass is raised to its uppermost position in the well.

In addition to vertical distance traveled, the weight of the movable mass is another variable that determines the amount of potential energy that may be stored by the potential energy conversion systems. Systems in which the movable mass travels over a larger vertical distance may utilize a movable mass having a lower weight to achieve a given amount of potential energy storage, and those in which the movable mass travels over a shorter distance may utilize larger masses to provide a comparable amount of potential energy storage. Thus, for a potential energy storage system featuring a given vertical distance over which the movable mass may travel, a mass of appropriate size may be chosen to provide a desired amount of potential energy storage (up to the failure point of a cable or similar holder suspending the movable mass within the non-producing well). As such, any size mass may be utilized without departing from the present disclosure. In various embodiments, the mass may weigh about 10 metric tons to about 300 metric tons. Practical considerations for the mass selection may include the well diameter and the carrying capacity for mechanical components of the systems (e.g., support lines, winches, re-directs, and the like).

The physical size of the movable mass in the wellbore may be determined by the wellbore diameter, the density of the material comprising the movable mass, and the vertical distance over which the bottom of the movable mass needs to travel vertically to store or release a given amount of energy. The maximum amount of energy storable or releasable by/from the potential energy conversion systems is determined by the relationship $E=mgh$, where $E$ is the stored/released energy, $m$ is the mass, $g$ is the gravitational acceleration constant (e.g., $9.8 \text{ m/s}^2$), and $h$ is the maximum displacement (height) over which the movable mass may move. In practice, $h$ may be related to the distance between the top of the wellbore and the length of the interval through which the movable mass transits in the disclosure herein. The distance over which the center of mass of the movable mass transits determines the amount of potential energy stored or released. Thus, the amount of energy storable/releasable is determined by the mass suspended in a given well, given that the maximum displacement may be fixed in a given well based on the vertical distance the movable mass may transit. If the movable mass is of insufficient size to store/release a given amount of energy and cannot be made "longer" (extend a larger vertical distance within the well), possible recourses are to increase the diameter of the movable mass by making the movable mass extend closer to the walls of the well (e.g., nearer the casing in a cased section of the well to define a narrower annulus) and/or increase the density of the material comprising the movable mass.

The non-producing well in which the potential energy conversion system is located may have substantially the same diameter in a substantially vertical upper section extending from the earth's surface to a plug in the well or between the earth's surface and the well bottoms. Alternately, the non-producing well in which the potential energy conversion system is located may have a non-uniform diameter between the earth's surface and a plug or the well bottoms. For example, in some embodiments, the non-producing well may taper and/or undergo stepwise graduations from a larger diameter to a smaller diameter at the plug or the well bottoms. In non-limiting examples, the well may have a minimum diameter of about 4 inches, or about 6 inches, or about 8 inches, or about 10 inches, or about 12 inches at a narrowest location within the well, which may be present in a non-producing well having a uniform or non-uniform diameter. These distances may represent the distance between the subterranean formation upon opposite sides of an uncased well or between the surface of a casing upon opposite sides of a cased well. The well diameter may dictate the amount of mass that may be present within a movable mass of a given material having a fixed length.

The diameter of the movable mass may have a maximum diameter that is slightly less than the minimum diameter of the non-producing well. The space between the movable mass and the walls of the well or the casing is referred to as the annulus. In non-limiting embodiments, the annulus between the walls of the well or the casing and the movable mass may be about 6 inches or less, or about 4 inches or less, or about 3 inches or less, or about 2 inches or less, or about 1 inch or less, or about 0.9 inches or less, or about 0.8 inches or less, or about 0.7 inches or less, or about 0.6 inches or less, or about 0.5 inches or less, or about 0.4 inches or less, or about 0.3 inches or less, or about 0.2 inches or less, or about 0.1 inches or less. In various embodiments, the annulus between the movable mass and the walls of the well or the casing may range from about 0.1 inches to about 1 inch, or about 1 inch to about 3 inches, or about 0.3 inches to about 0.8 inches, or about 0.2 inches to about 0.5 inches, or about 0.5 inches to about 1.0 inches. A given annulus size may be chosen (e.g., a non-producing well having a specified annulus size may be selected) to afford a size of the movable mass sufficient to store or release a specified amount of energy. In addition, a given annulus size may be chosen (e.g., a non-producing well having a specified annulus size may be selected) to afford a comfortable transit of the movable mass through the well or the narrowest section thereof. Centralizers may be present upon the surface of the movable mass to dampen contact with the walls of the well and to facilitate transit therethrough in the course of storing or releasing potential energy according to the disclosure herein. The fluid within the well may further provide lubrication between the movable mass and the walls of the well should incidental contact occur therebetween.

The movable mass may fill a substantial fraction of the available volume within a well or an interval thereof, such as about 20% or more of the well volume, or about 30% or more of the well volume, or about 40% or more of the well volume, or about 50% or more of the well volume, or about 60% or more of the well volume, or about 70% or more of the well volume, or about 80% or more of the well volume. A maximum volume occupied by the movable mass may be dictated by the vertical distance over which the movable mass needs to move when storing or releasing potential energy. In non-limiting embodiments, the maximum volume occupied by the movable mass may be about 95% or less of the well volume, or about 90% or less of the well volume, or about 85% or less of the well volume, or about 80% or less of the well volume, or about 75% or less of the well volume, or about 70% or less of the well volume, or about 65% or less of the well volume, or about 60% or less of the well volume, or about 55% or less of the well volume, or about 50% or less of the well volume, or about 45% or less of the well volume, or about 40% or less of the well volume, or about 35% or less of the well volume, or about 30% or less of the well volume, or about 25% or less of the well volume, or about 20% or less of the well volume, or about 15% or less of the well volume, or about 10% or less of the well volume, or about 5% or less of the well volume.

In the disclosure herein, the balance of the well volume or the well volume in an interval of the well (i.e., the volume not occupied by the movable mass) may be filled with a fluid. Fluids that may be installed in the well include, for example, aqueous fluids, including any compatible aqueous fluids known in the art of wellbore drilling and production. Suitable fluids may include one or more additives, including additives to minimize corrosion and/or to modify various rheological properties or reduce friction. For example, a suitable fluid may include additives such as nanosodium silicate at a concentration in a parts per million range (ppm, e.g., up to about 100 ppm) to coat steel components of the potential energy conversion systems against corrosion, reduce friction between guide and steel, and to otherwise reduce overall drag as a movable mass is moved up and down within the well. In another example, a fluid in the well may include high-density brines or chemicals to maintain hydrostatic pressure to minimize well casing damage and limit inadvertent ingress of hydrocarbons into the interval of the well where the movable mass resides. In non-limiting examples, the fluid in the well may include one or more of biocides, anti-corrosion chemicals, friction reducers, scale inhibitors, rheology modifiers, and the like to prevent damage to the potential energy conversion systems during extended deployment in the well.

The movable mass may be elongated to fit effectively within the well and have a length of up to about 1000 feet, or up to about 2000 feet, or up to about 3000 feet, or up to about 4000 feet, or up to about 5000 feet, or up to about 6000 feet, or up to about 7000 feet, or up to about 8000 feet, or up to about 9000 feet, or up to about 10000 feet, or up to about 11000 feet, or up to about 12000 feet, or up to about 13000 feet, or up to about 14000 feet, or up to about 15000 feet, or up to about 16000 feet, or up to about 17000 feet, or up to about 18000 feet, or up to about 19000 feet, or up to about 20000 feet. To facilitate introduction to the well, the movable mass may be inserted modularly in smaller sections to the well.

Potential energy conversion systems disclosed herein may be installed within a non-producing well, typically after the well has finished its service lifetime for extracting a resource from a subterranean formation. The well may be uncased or cased (completed), and may be capped or uncapped (open hole) Initially uncapped wells may be capped with a wellhead at a surface opening thereof during installation of the potential energy conversion systems disclosed herein, thereby addressing both potential energy storage and environmental releases from the uncapped well. In a first step, an uncapped hydrocarbon well may be selected, preferably a well completed with a production casing extending from the surface down to an oil bearing formation. Completed wells typically include one or more intervals having perforations about the diameter of the casing to allow the ingress of hydrocarbons from a hydrocarbon-bearing rock (subterranean formation). During installation of the potential energy conversion systems, a plug may be inserted above the perforations, such as a cement plug, packer, or other zonal isolation equipment that closes off the cased interval from ingress of hydrocarbons and other connate fluids into a section of the wellbore above the plug. A suitable plug may be chosen based upon the well conditions and regulatory requirements where the well is located. The well may then be cleaned of hydrocarbons and then filled with a fluid in the interval through which the movable mass transits (i.e., an upper portion of the well). As discussed above, the fluid may be present in an amount to provide a constant buoyancy to the movable mass and facilitate its transit within the well.

To facilitate a better understanding of the present disclosure, reference is made to the appended drawings, which show illustrative embodiments of the present disclosure.

Figure 1B:
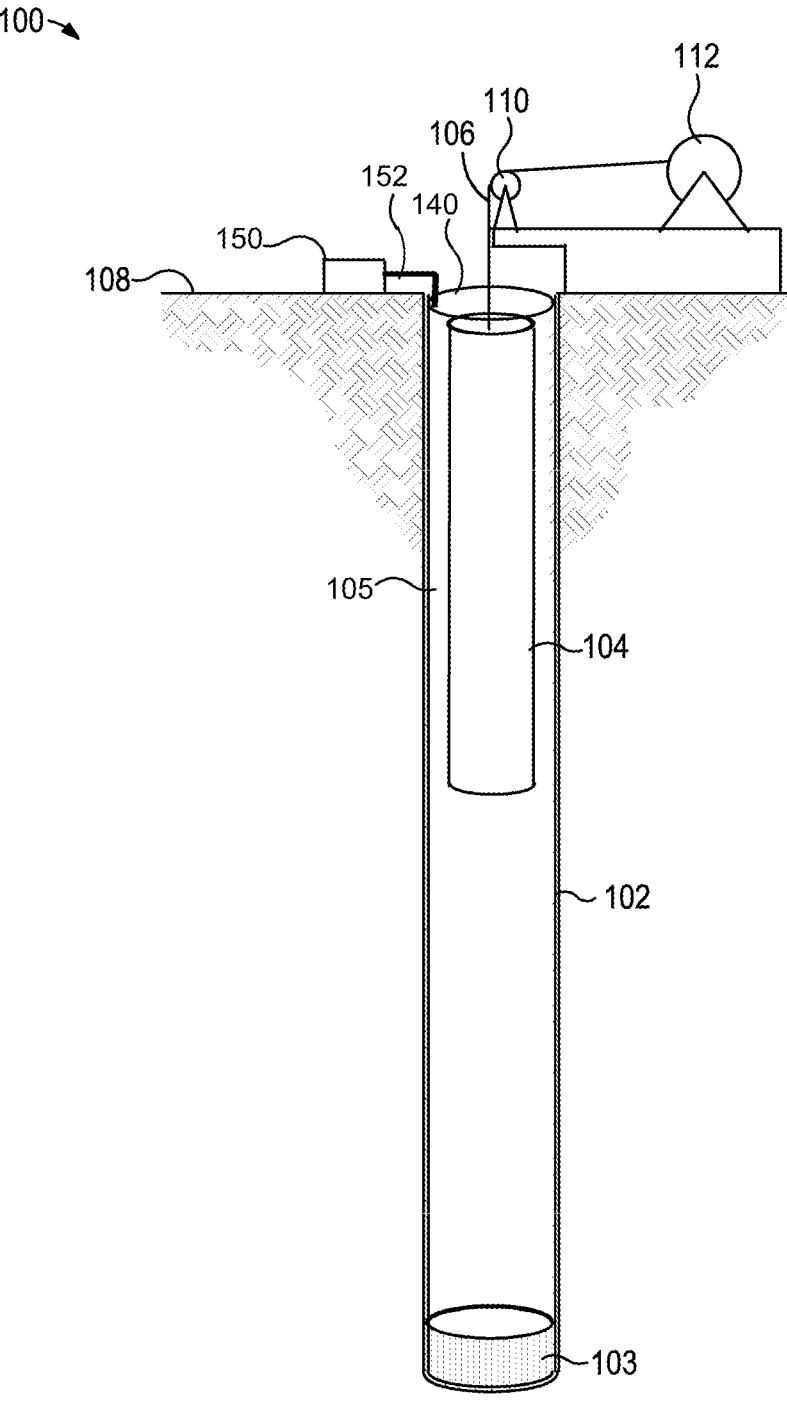
Figure 1C:
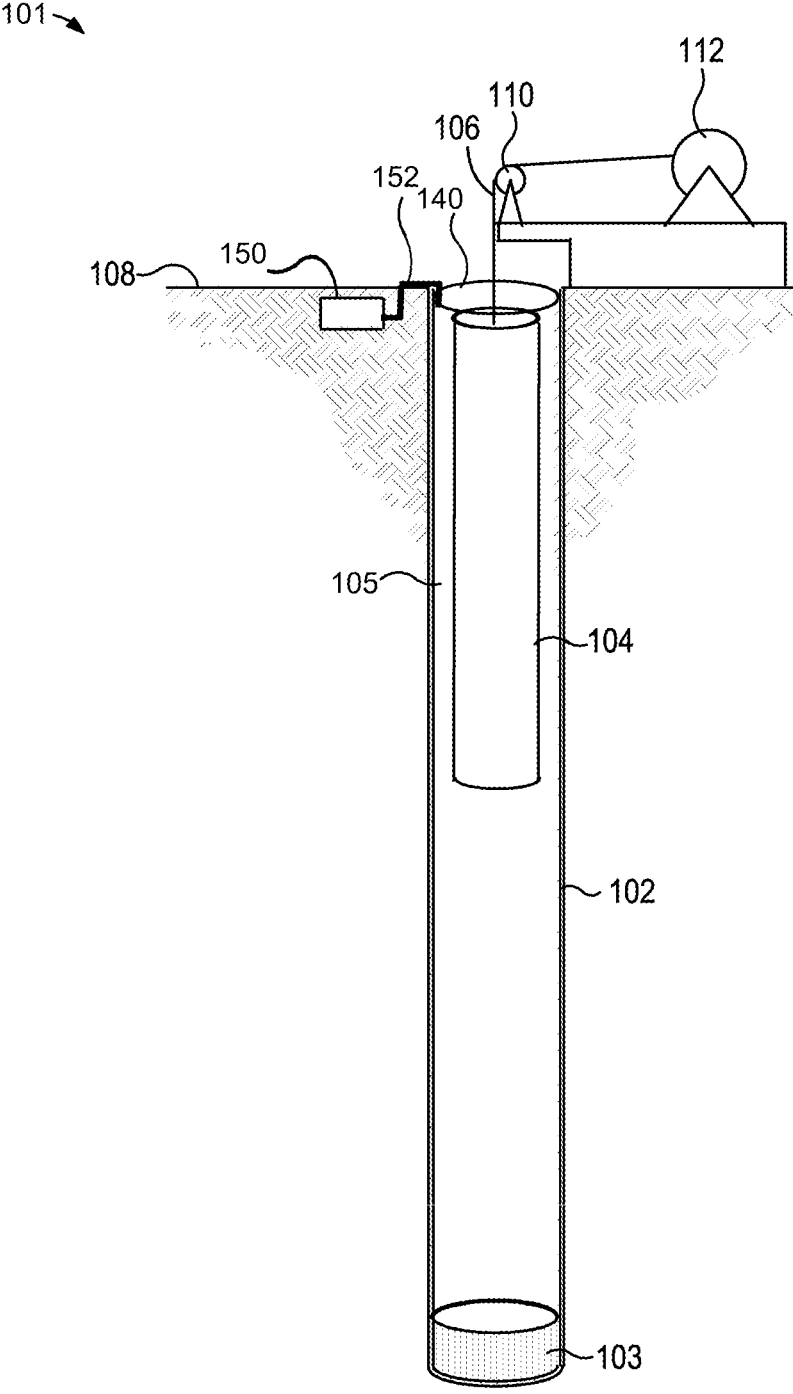
FIG. 1C is a diagram of an alternative potential energy conversion system.

FIGS. 1A-1C are diagrams of a potential energy conversion system 100 housed in a non-producing well 102 in accordance with the present disclosure. Movable mass 104 is suspended in well 102 and travels in a cased interval of well 102 extending between surface 108 and plug 103 placed at some depth (e.g., thousands of feet) in the well 102. FIG. 1A shows potential energy conversion system 100 in a discharged position, with movable mass 104 in a lowered position in well 102. FIG. 1B correspondingly shows potential energy conversion system 100 in a charged position, with movable mass 104 in a raised position at or near the top of well 102. Annulus 105 is defined between the surface of movable mass 104 and the walls of well 102. Plug 103 may isolate an upper section of well 102 from a lower section (not shown) of well 102, with movable mass 104 being located in the upper section. Movable mass 104 may include any object of suitable weight dimensioned for emplacement and movement within well 102. In one example, movable mass 104 may be created from steel tubing that is filled with iron ore pellets and fluid to increase the weight and/or density. Movable mass 104 may also include one or more dense metals (e.g., tantalum or tungsten) and/or high-density fillers, such as depleted uranium, cement, sand, and the like. Movable mass 104 is suspended by a line 106, such as, but not limited to, a cable, wire rope, chain, synthetic rope, or the like. Line 106 may have a diameter ranging from about 1 cm to about 8 cm, or about 2.5 cm to about 7.5 cm, for example, with a suitable diameter being selected to facilitate transport of a given weight of movable mass 104. Line 106 connects the movable mass 104 to an electric motor capable of raising and lowering the movable mass 104 during operation, such as winch 112. The connection between movable mass 104 and winch 112 may include one or more sheave pulleys 110 or similar mechanical components that re-direct the force on line 106 as needed. The suspension components, including line 106, winch 112, and sheave pulleys 110, may also incorporate a number of swivels or other protection devices in-line that prevent damage to line 106 such as from twisting, binding, abrading, and the like.

Winch 112 may be a regenerative winch that can expend power by spooling up line 106 to elevate movable mass 104, and also generate electricity when operated in reverse as line 106 is extended to lower movable mass 104 downward under the influence of gravity. Fluid within well 102 may arrest the speed at which movable mass 104 is lowered when releasing the stored potential energy. Regenerative winches suitable for use in potential energy conversion systems may supply electricity as needed (e.g., to the electrical grid), or may be configured to transfer electricity to another storage medium, such as a battery or supercapacitor.

Alternately, winch 112 may be a standard winch that operates to raise the movable mass 104, while a separate generator (not shown) is mechanically connected to movable mass 104 to generate electricity as movable mass 104 is lowered within the well 102. Line 106 may be decoupled between winch 112 and a separate generator to provide raising or lowering capabilities as needed, or a second line 106 may be coupled to the separate generator. For example, winch 112 and a separate generator may be deployed such that winch 112 drives a spool when elevating movable mass 104 and the generator (not shown) is driven when lowering movable mass 104 through gears or other means of interfacing with the spool, such that each task can be performed separately and, if necessary, optimized for efficiency consideration of winching or power generation. It is also within the scope of this disclosure that multiple winches 112 may be used to control one or more movable masses 104, where at least one of the multiple winches 112 are regenerative winches. Further, while system 100 is shown with sheave pulleys 110 and winch 112, other suitable mechanical devices or electric motors may be used interchangeably including the use of a hoist, crane, or other suitable lifting device.

Movable mass 104 may be centered in the well 102 using a series of centralizers (not shown) along the length of movable mass 104. Centralizers suitable for stabilizing movable mass 104 may be designed such that only incidental contact occurs as the movable mass 104 transits vertically within the well 102. Centralizers may also serve to mitigate casing wear by providing a sacrificial surface (a softer material than the well walls, for example) and by minimizing friction through other methods such as the shape of centralizer, and material selection for coefficients of friction with casing material or fluid in well 102. By reducing friction in potential energy conversion system 100, centralizers may also improve energy efficiency and round-trip efficiency, thereby mitigating energy loss by decreasing casing-to-weight surface friction, viscous drag, and resistive pressure force through shape and material selection. The diameter of the centralizers may vary depending on the application, and may be gauged to account for features within well 102, such as overall diameter of the casing in the well 102, bends and deviations within the well 102, and other factors familiar to those in the art of emplacement of wellbore tools. Centralizers installed on movable mass 104 may be made from any suitable material for use in oil well centralizers, including ultrahigh molecular weight polyethylene, for example.

FIG. 1A shows movable mass 104 in a discharged (lowered) position. As indicated above, when the volume of well 102 is filled with a fluid at fill level 140, some of the fluid may be displaced from well 102 by the volume of line 106 as line 106 is introduced into well 102. Fill level 140 of the fluid is maintained as movable mass 104 is lowered into well 102 (due to the introduced volume of line 106), but will drop as movable mass 104 is subsequently raised and volume is removed from well 102, unless provisions are made to capture the displaced fluid. In the disclosure herein, fluid displaced from well 102 as movable mass 104 is lowered may be transported in conduit 152 and subsequently captured in storage tank 150. Fluid may be transported through conduit 152 under hydrostatic forces, or movement of the fluid may be further encouraged by one or more pumps (not shown). When movable mass 104 is raised, as shown in FIG. 1B, the displaced fluid is discharged from storage tank 150 and is returned via conduit 152 to well 102. Thus, storage tank 150 and conduit 152 may collectively maintain fill level 140 of the fluid within well 102 as the volume of line 106 in well 102 changes during raising and lowering of movable mass 104. Conduit 152 and optionally storage tank 150 may contain at least some fluid when movable mass 104 is at its uppermost position in well 102 (FIG. 1B). Alternately, conduit 152 and storage tank 150 may be empty when movable mass 104 is at its uppermost position.

The position of conduit 152 and storage tank 150 in FIGS. 1A and 1B are illustrative in nature and are intended to demonstrate the basic concepts of the present disclosure. It is to be appreciated that since well 102 is shown open-hole in FIGS. 1A and 1B, a pump (not shown) may be used to encourage transport of the fluid through line 150 into storage tank 152, since as-drawn FIGS. 1A and 1B have shown storage tank 150 above fill level 140. If well 102 is closed-hole (FIG. 2), hydrostatic pressure may be sufficient to promote fluid transport through line 150 into storage tank 152. Alternately, storage tank 150 may be recessed into surface 108 to facilitate at least partial filling of storage tank 150 under the influence of gravity. Again, a pump (not shown) may be utilized to promote filling or emptying of storage tank 150, if needed. Such a configuration for storage tank 150 is shown for potential energy conversion system 101 in FIG. 1C. As still another possible location, storage tank 150 may be housed within the drum of winch 112, or within a frame supporting winch 112 and/or sheave pulleys 110.

Figure 2:
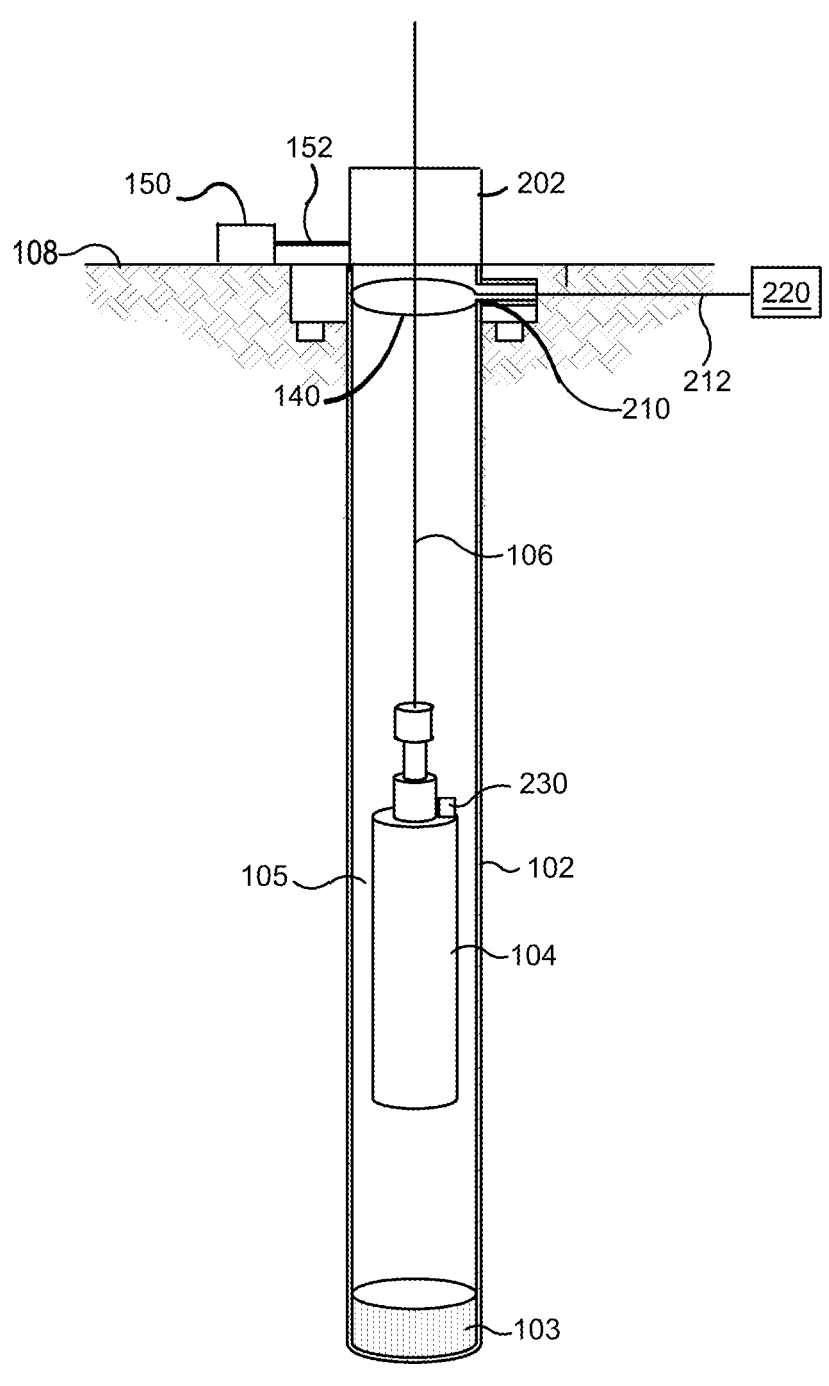
FIG. 2 is a diagram of a potential energy conversion system of the present disclosure in which a well is closed with a wellhead.

Although FIGS. 1A-1C have shown well 102 being open (open-hole) at surface 108, it is to be appreciated that well 102 may be closed with a wellhead to seal a surface opening of well 102 in other common implementations. The well-head may provide another convenient location for connection of storage tank 150 and allow gravity filling thereof as fluid overfills well 102, enters the wellhead, and is transported under hydrostatic pressure to storage tank 150. FIG. 2 shows a diagram of potential energy conversion system 200, in which line 106 extends through wellhead 202 and storage tank 150 is connected to wellhead 202 via conduit 152. Wellhead 202 is shown as a blowout preventer in the depicted configuration, although it is to be appreciated that other wellhead structures may also be suitable, provided that line 106 may suitably extend therethrough to support movable mass 104. In the interest of clarity, sheave pulley system 110 and winch 112 are not shown in FIG. 2, but their presence is to be understood. For example, line 106 may extend through wellhead 202 to promote the lifting and lowering functions described above. As the fluid overfills well 102 upon lowering movable mass 104 and the fluid enters wellhead 202, the fluid may exit wellhead 202 under the influence of gravity and hydrostatic pressure and at least partially fill storage tank 150. When movable mass 104 is raised, the fluid may exit storage tank 150 and re-enter wellhead 202 before being returned to well 102. Other elements of FIG. 2 having similar structure and function to those shown in FIGS. 1A and 1B are assigned common reference characters and are also not described in further detail herein in the interest of brevity.

In addition to well 102 being closed with wellhead 202, potential energy conversion system 200 also may optionally include sampling location 210, which may be in fluid communication with the interior of well 102 and facilitate direct fluid withdrawal therefrom or be in electronic communication with one or more sensors 230 disposed within well 102. Although sampling location 210 is shown below surface 108 in FIG. 2, it is to be appreciated that sampling location 210 may reside on surface 108 and be in fluid communication with well 102 via wellhead 202. When present, sensors may be present at any location within well 102, such as upon movable mass 104 (as shown), and/or the casing of well 102, upon line 106, or even upon the surface of the fluid filling the well. The electronic communication with sensors 230 may occur in a wired or wireless manner. Thus, sampling location 210 may directly convey withdrawn fluid via line 212 to monitoring module 220 and/or communicate sensor data (wired or wireless) to monitoring module 220 to provide information about the conditions in well 102 and/or the operational status of potential energy conversion system 200. Fluids withdrawn from well 102 for direct sampling thereof may include the fluid through which movable mass 104 transits and/or a gas present in a head-space above fill level 140 (e.g., a potential void space below wellhead 202). In some examples, sensing of the fluid within well 102 may also be conducted using one or more sensing ports located upon movable mass 104 or a connection thereto.

It is also to be appreciated that one or more sensors may be located at other locations within wellhead 202, including locations at which direct fluid sampling is not feasible. For example, one or more sensors may be housed in wellhead 202 at a location above surface 108. Conditions that may be sensed using one or more sensors disposed within wellhead 202 in accordance with the foregoing include pressure, temperature, or volume within well 102 and/or wellhead 202 and/or the composition and analysis of one or more gases being released from well 102. Various mechanical properties may also be assessed using one or more sensors, either directly or indirectly, such as proximity of movable mass 104 to wellhead 202, depth and movement of movable mass 104 within well 102, and the like. One or more of these conditions may be indicative of the health of well 102 and/or the operational state of potential energy conversion system 200, for example.

As indicated above, other locations may be more convenient for assaying conditions within well 102, especially when all or a substantial fraction of well 102 or an interval thereof is filled with a fluid to maintain movable mass 104 partially or fully immersed when movable mass 104 is raised to its uppermost position in well 102. In particular, various monitoring locations outside the interior of well 102 may alternately be utilized for monitoring conditions within well 102, optionally in combination with direct or indirect fluid monitoring within well 102, as discussed previously. Conditions that may be monitored externally to determine conditions within well 102 may include, but are not limited to, gas pressure, hydrostatic pressure of a liquid column, amount and type of hydrocarbon gases (e.g., methane) and/or acid gases (e.g., hydrogen sulfide) being emitted from well 102, or any combination thereof. Other conditions that may be monitored in a fluid within well 102 include, for example, density, redox potential, viscosity, total dissolved solids, saline concentration, and/or the concentration of an additive intended to modify one or more properties of the fluid.

In some examples, conditions within well 102 may be monitored using one or more sensors within storage tank 150 and/or conduit 152 leading from the interior of well 102 to storage tank 150. In some embodiments, pressure and/or hydrocarbon gases within well 102 or the fluid within well 102 may be monitored using one or more sensors in this location. In some examples, the hydrostatic pressure of the fluid within storage tank 150 may be measured by immersion of a sensor in the fluid. The conditions assessed within storage tank 150 may also be utilized directly or indirectly to determine other conditions within well 102, such as location, proximity, and/or movement of movable mass 104 and/or line 106 within well 102.

In some examples, conditions within well 102 may be monitored with one or more sensors located within wellhead 202. In some embodiments, pressure and/or hydrocarbon gases within well 102 or the fluid within well 102 may be monitored using one or more sensors in this location. The conditions assessed within wellhead 202 may similarly be utilized directly or indirectly to determine other conditions within well 102, such as location, proximity, and/or movement of movable mass 104 and/or line 106 within well 102.

Within storage tank 150 and wellhead 202, fluid composition and/or pressure may be directly measured, since storage tank 150 and wellhead 202 are in direct fluid communication with well 102. For example, the pressure in storage tank 150 and wellhead 202 may be substantially similar to that at the top of well 102. Hydrostatic pressure of the fluid may also be measured in each of these locations as well.

When monitoring for gaseous hydrocarbons and/or acid gases being emitted from well 102, still other monitoring locations may also be suitable for positioning of one or more sensors. That is, it may be suitable and desirable to perform monitoring at one or more locations external to one or more structures not defining a closed system with well 102. Such locations external to well 102 may include, but are not limited to sheave pulley system 110 or other locations above wellhead 202. Locations on surface 108 or suspended above surface 108 at locations surrounding wellhead 202 may also be appropriate (i.e., proximate to well 102). Sensors may be suitably proximate to well 102 when the sensors can suitably detect a component or condition within well 102 above a detection limit thereof. When a plurality of potential energy conversion systems similar to potential energy conversion system 200 are located together in a field, one or more sensors located in between adjacent wells 102 may monitor for hydrocarbon gases and/or acid gases being emitted from one or more of wells 102. By monitoring adjacent wells 102 in this manner, multiple wells 102 may be monitored simultaneously. If excessive hydrocarbon gases and/or acid gases are being detected external to adjacent wells 102, this may be indicative of an issue with wellhead 202 and/or plug 103 in one or more of wells 102. If a problem is indicated, more advanced analyses may be conducted to determine which of the one or more adjacent wells 102 is the source of the hydrocarbon gases and/or acid gases being emitted.

Accordingly, various embodiments of potential energy conversion systems disclosed herein may comprise: a movable mass suspended by a line in a non-producing well, the line being coupled to a motor operable to lift the movable mass and a generator operable to produce electricity when lowering the movable mass; a fluid filling at least a portion of the non-producing well, a volume of the fluid being sufficient to at least partially immerse, preferably at least fully immerse, the movable mass when the movable mass is raised to an uppermost position in the non-producing well; and a storage tank configured to receive fluid displaced from the non-producing well as the movable mass is lowered from a higher location to a lower location in the non-producing well and to return the fluid into the non-producing well as the movable mass is raised from the lower location in the non-producing well. Preferably the non-producing well has an upper section, a lower section, and a plug isolating the upper section from the lower section, in which the movable mass is located in the upper section of the non-producing well. In some embodiments, the storage tank may contain at least some fluid when the movable mass is raised to its uppermost position (i.e., when a minimum amount of fluid is displaced from the well).

Other various embodiments of the potential energy conversion systems may comprise: a movable mass suspended by a line in a non-producing well, the line being coupled to a motor operable to lift the movable mass and a generator operable to produce electricity when lowering the movable mass; a wellhead sealing a surface opening of the non-producing well; wherein the line is coupled to a sheave pulley system located at a surface opening of the non-producing well; and at least one sensor operable to provide information about a condition in the non-producing well, an operational status of the potential energy conversion system, or any combination thereof. The at least one sensor may be operable to measure one or more fluid properties, gas properties, or any combination thereof within the non-producing well.

In non-limiting examples, the at least one sensor may be located within the wellhead, upon the sheave pulley system, at a surface location proximate to the non-producing well, or any combination thereof. Preferably the non-producing well has an upper section, a lower section, and a plug isolating the upper section from the lower section, in which the movable mass is located in the upper section of the non-producing well. In addition, the potential energy conversion systems may include a fluid in which the movable mass is partially or fully immersed, preferably fully immersed, when the movable mass is located at an uppermost position within the well.

As referenced above, the potential energy conversion systems disclosed herein may also incorporate monitoring capabilities (e.g., a monitoring sub-system incorporating one or more sensors) operable to measure environmental variables within the well such as liquid or gas pressure, gas composition, fluid level (volume), temperature, and fluid composition, including changes therein. Other mechanical properties such as distance, proximity, and position may be indirectly determined from such environmental variables. Relevant fluid or gas properties that may be monitored include one or more of the fluid column height (fill level), pressure, density, redox potential, viscosity, hydrocarbon (fluid and gas) concentration and pressure (e.g., methane concentration and pressure), total dissolved solids, saline concentration, the like and any combination thereof. Operation of the potential energy conversion systems may impact or be impacted by one or more of these fluid or gas properties. By appropriately monitoring these properties, an operator may be alerted to a potentially adverse well condition, change the operating parameters associated with the potential energy conversion systems (e.g., to facilitate more efficiency energy storage and release to an electrical grid), address an incorrect operating condition of the potential energy conversion systems causing an undesired fluid or gas property, or any combination thereof, as explained in further detail hereinafter. Conventional liquid and gas sensors may be utilized in conjunction with the foregoing, with a specific type of sensor being utilized in the particular location where sensing is taking place and the type of measurement needed.

Monitoring sub-systems associated with the potential energy conversion systems may be useful for alerting an operator to changes in well conditions that may be indicative of various system failure modes, including fluid loss, fluid intrusion, deterioration of the wellbore casing or a plug, failure of system components within the well or the potential energy conversion system, and the like. Monitoring the conditions within the well may ensure an interval containing the potential energy conversion systems remain sealed and inaccessible to fluids intruding through the casing, for example, while also ensuring other appropriate operating conditions are maintained (e.g., pressure, temperature fluid level, fluid composition, and the like), ensuring the movable mass is positioned correctly and moving as intended, and mitigating emergent risks. Monitoring may occur within the well (internally) and/or external to the well, as discussed above.

Potential energy conversion systems disclosed herein may also include one or more failsafe devices that mitigate or minimize damage to system components such as the well casing, well plug, the movable mass and its associated suspension systems, and other mechanical components, including during detachment or loss of control of the movable mass. Failsafe devices may operate by slowing movement of the movable mass within the well and/or by reducing the impact of a falling mass on critical system components, such as a plug or other downhole fixtures isolating the system from the rest of the well. Failsafe devices may directly mitigate failure modes associated with the operation of the potential energy storage devices in a well, including plug damage, casing damage, containment failure, well blowouts, and the like.

Failsafe devices may provide risk mitigation based upon at least two failure modes: 1) a movable mass falling uninhibited within the well, such as during support line failure; or 2) inadvertent contact between a movable mass and the well plug during normal operation of the device. Failsafe devices may feature dissipation of momentum of a falling mass over a longer time to ensure that the well plug is not compromised during impact and/or by absorbing kinetic energy at the site of the impact. Failsafe devices of various types may be utilized in the disclosure herein, either alone or in combination. When multiple failsafe devices are employed, the individual failsafe devices may be employed for redundant protection, if desired. Various aspects of suitable failsafe devices are described hereinafter in reference to FIGS. 3-9E. Potential energy conversion systems utilized in FIGS. 3-9E are similar to those depicted in FIGS. 1A-1C and 2 and may be better understood by reference thereto.

Figure 3:
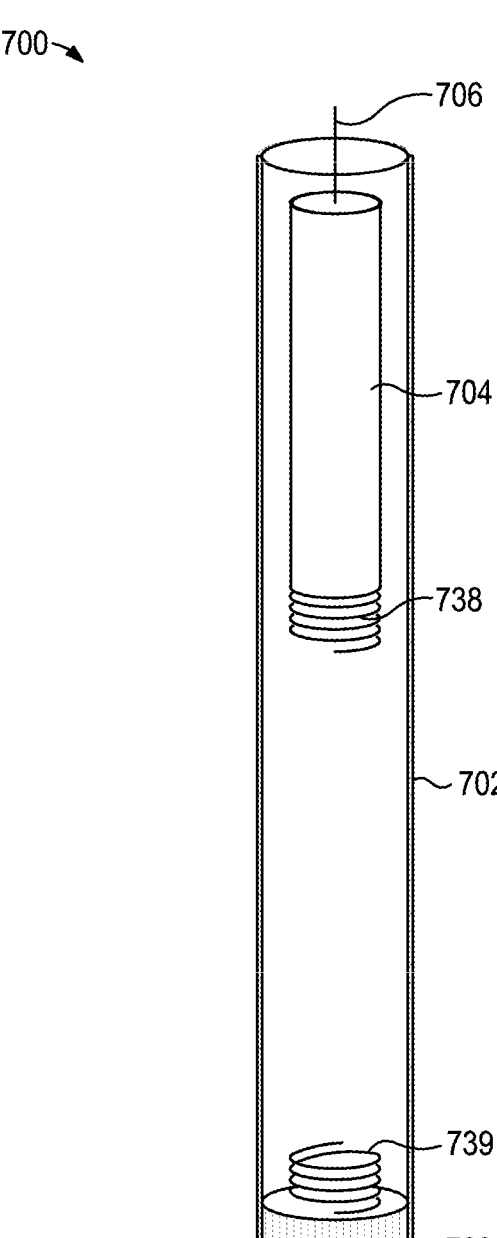
FIG. 3 is a diagram of a portion of a potential energy conversion system incorporating a failsafe device featuring one or more springs for protecting a well plug.

FIG. 3 is an illustration of a potential energy conversion system 700 incorporating a failsafe featuring one or more springs 738 and/or 739 for protecting a plug of a well housing the potential energy conversion system 700. Potential energy conversion system 700 includes a movable mass 704 supported by line 706 within an interval of well 702 that is sealed from a lower interval (section) by plug 703. Movable mass 704 is equipped with a spring 738 that functions as a failsafe device to protect plug 703 during an uncontrolled descent of movable mass 704, such as following breakage of line 706. Alternately or in addition, potential energy conversion system 700 may incorporate a spring 739 affixed to plug 703. Attachment of spring 738 to movable mass 704 and/or attachment of spring 739 to plug 703 may be accomplished by any suitable method such as welding, adhesive bonding, or submersion in cement (integrated into a cement plug, for example) depending on the material of movable mass 704 and/or plug 703.

Spring 738 and/or spring 739 may be a compression spring such as, but not limited to, a helical compression spring, conical spring, or solid (in the case of a rubber, for example), and may be made of a suitable material such as steel alloy, titanium, another metal, rubber, polyurethane, or the like. Spring 738 and/or spring 739 may independently vary in length depending on the size of the mass 704 and depth of the well 702. In one example, spring 738 and/or spring 739 may independently range from about 6 inches to about 3 feet in length, and may independently have a diameter between about 2 inches and about 8 inches, depending on the diameter of the well.

Figure 4:
FIG. 4 is a diagram of a portion of a potential energy conversion system incorporating a failsafe device featuring a deformable structure for protecting a well plug.
Figure 4:
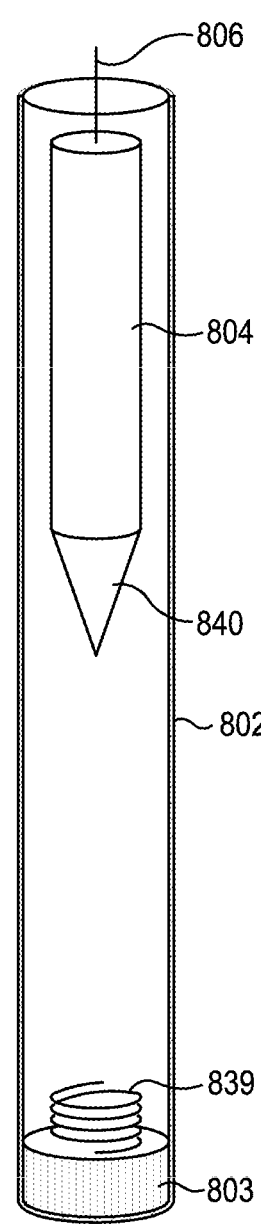

FIG. 4 is an illustration of a potential energy conversion system 800 incorporating a failsafe featuring a deformable structure for protecting a plug of a well housing the potential energy conversion system. Potential energy conversion system 800 includes movable mass 804 supported by line 806 within an interval of well 802 that is sealed from a lower interval by plug 803. In this example, movable mass 804 includes a collapsible structure 840 (depicted as a cone in FIG. 4) affixed thereto that is selected and/or designed for failure mechanics that dissipate the energy of a falling mass when it contacts the plug 803 and/or walls of the well 802. For example, collapsible structure 840 may crumple or collapse upon impact with plug 803. Collapsible structure 840 may be combined with a spring 839 installed on plug 803 for further decreasing impact. Alternately, a second collapsible structure may replace spring 839 upon plug 803.

Collapsible structure 840 may function as a part of mass 804 by contributing mass or facilitating fluid flow around mass 804 during normal operation of potential energy conversion system 800. For collapsible structure 840, the length of the collapsible structure 840 may vary according to the size (weight and diameter) of the mass 804, depth of the well 802, and the diameter of well 802. Collapsible structure 840 may be formed from materials that collapse or deform predictably during impact, such as steel or rubber. Construction of collapsible structure 840 can include any suitable technique for forming the selected material, including stamping, lathing, and/or cutting/molding rubber or a similar collapsible material.

Figure 5:
FIG. 5 is a diagram of a portion of a potential energy conversion system incorporating a failsafe device featuring one or more magnets for protecting a well plug.

FIG. 5 is an illustration of a system incorporating a failsafe featuring one or more magnets for protecting a plug of a well housing a potential energy conversion system. In the failsafe device configuration shown in FIG. 5, potential energy conversion system 900 includes movable mass 904 supported by line 906 within an interval of well 902 that is sealed from a lower interval by plug 903. In this example, magnetic repulsion mitigates impact between movable mass 904 equipped with magnet 942 and plug 903 equipped with a magnet 943. Magnets 942 and 943 are oriented such that like poles of magnets 942 and 943 repel one another as the distance between movable mass 904 and plug 903 decreases. In addition to mitigating impact, failsafe devices may also be used to calibrate (and recalibrate) the distance between movable mass 904 and plug 903, for example, to monitor the lift/lower distance of the system 900 during operation and to compensate for line stretch or inaccurate weight location by other techniques. In another example, movable mass 904 may include a sensor thereon for determining the distance between the bottom of movable mass 904 and plug 903 within well 900.

The amount of magnetic material present in magnets 942 and 943 may be selected by considering one or more of the holding pressure of the plug 903, the magnetic flux density, and the size of movable mass 904. Magnets 942 and 943 may feature any suitable shape including, but are not limited to, a solid cylinder, a hollow cylinder, or a pile of pellets ranging from about 6 inches to about 15 feet long. In some cases magnets 942 and 943 may be prepared from a permanently magnetic material such as neodymium or other rare earth magnetic material. Magnets 942 and/or 943 may also be collapsible in some cases.

Failsafe devices suitable for use in the disclosure herein may also utilize fluid resistance and/or friction to slow a mass during an uncontrolled fall, such as following a line break. Increasing fluid resistance may include expanding the outer diameter of the mass to contact the casing of the well or through the deployment of a structure (e.g., an airbag or parachute) to increase fluid drag.

Figure 6A:
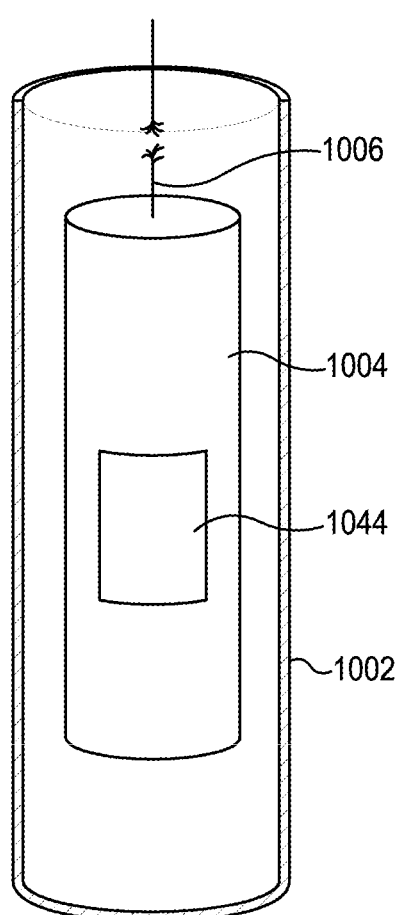
FIGS. 6A-6D are diagrams of various views of a portion of a potential energy conversion system incorporating a movable mass equipped with a mechanical arrestor for producing drag or friction for protecting a well plug.
Figure 6B:
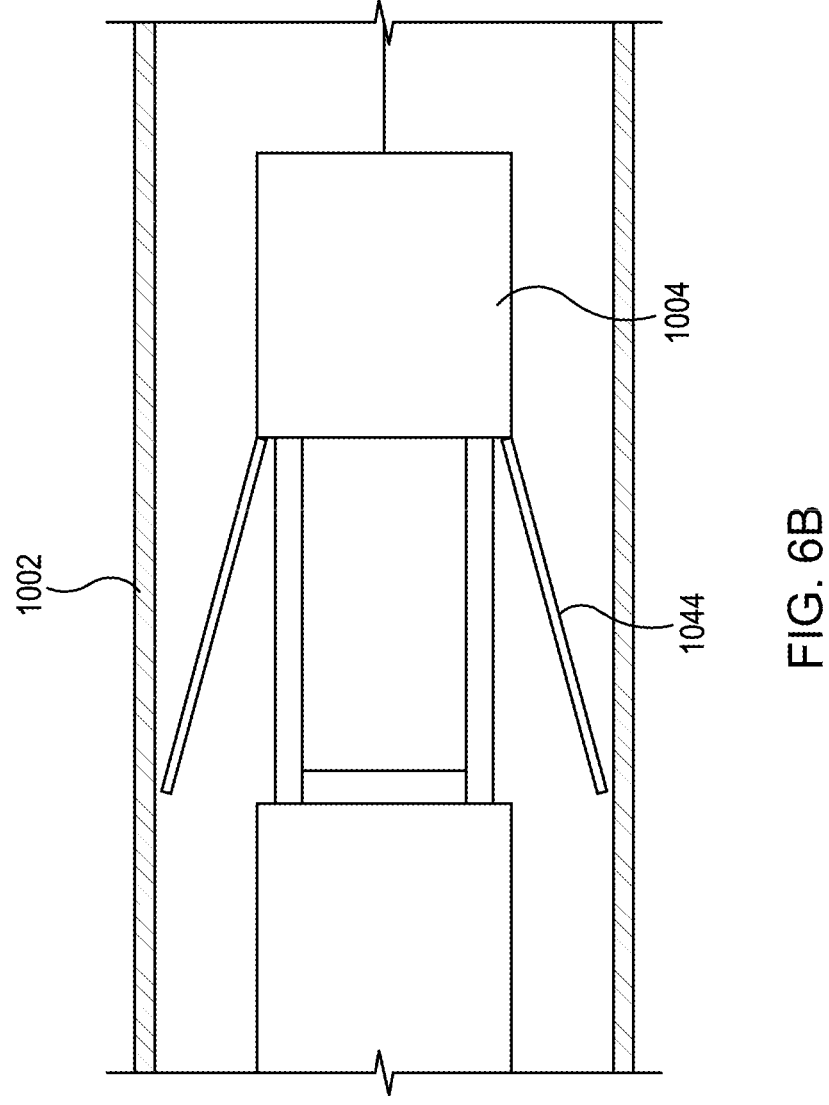
Figure 6D:
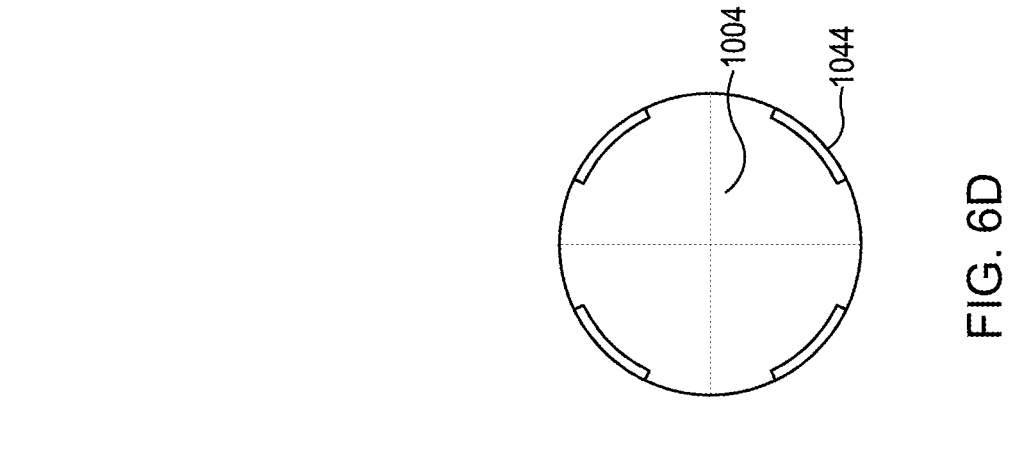
Figure 6C:
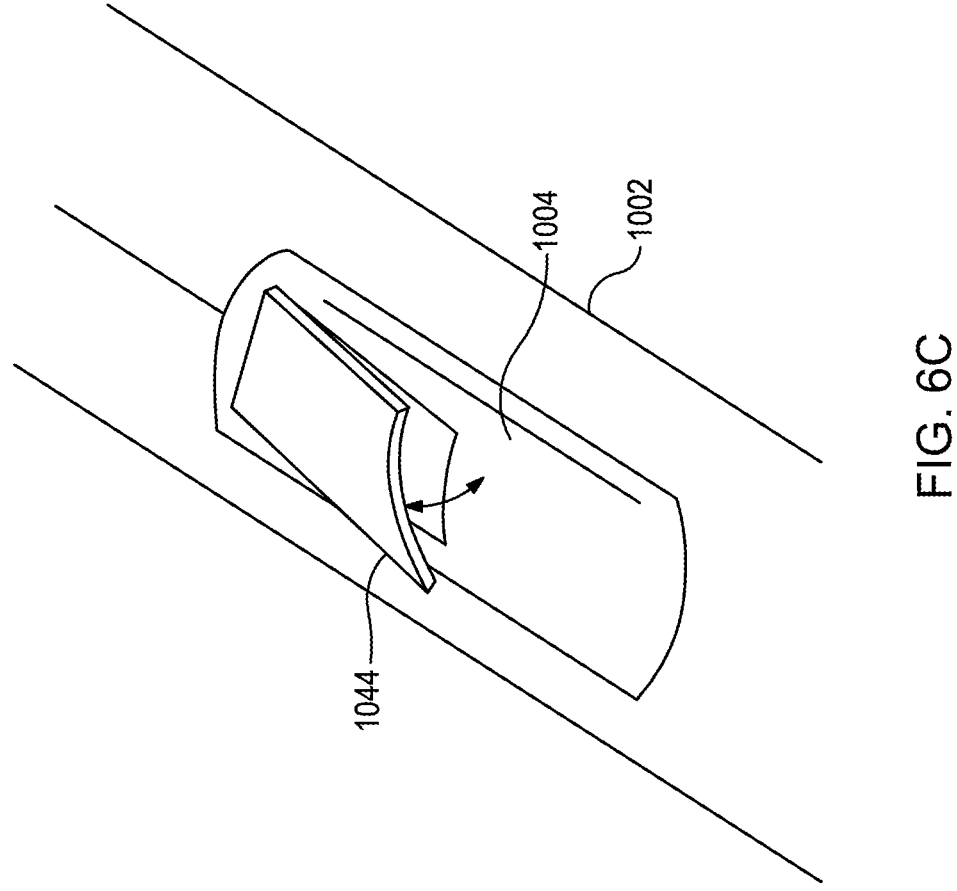

FIGS. 6A-6D are various views of a portion of potential energy conversion system 1000 incorporating mass 1004 equipped with a mechanical arrestor for producing drag for protecting a plug of a well. In FIG. 6A, potential energy conversion system 1000 includes movable mass 1004 supported by line 1006 within an interval of well 1002. In this example, a flapper 1044 is installed on movable mass 1004 and may autonomously activate to increase the diameter of movable mass 1004 during an uncontrolled fall. As shown in alternative views (FIGS. 6B and 6C), under sufficient fluid flow opposite the direction of movement of movable mass 1004, flapper 1044 may extend away from a longitudinal axis of movable mass 1004, thereby increasing fluid drag and the decreasing descent velocity. Multiple flappers 1044 may be installed depending on the size of movable mass 1004. For example, depending on the size of movable mass 1004, a single pair of flappers 1044 (on opposite sides of movable mass 1004) may be sufficient to slow movable mass 1004 during an uncontrolled descent. Alternately, multiple pairs of flappers 1044 may be installed around the perimeter of movable mass 1004. For example, as shown in FIG. 6D, four flappers 1044 may be installed around the perimeter of movable mass 1004. Flappers 1044 in this example are installed symmetrically in pairs to keep the movable mass 1004 as centered as possible during a descent. However, asymmetric arrangements of flappers 1044 are also within the scope of this disclosure.

Figure 7B:
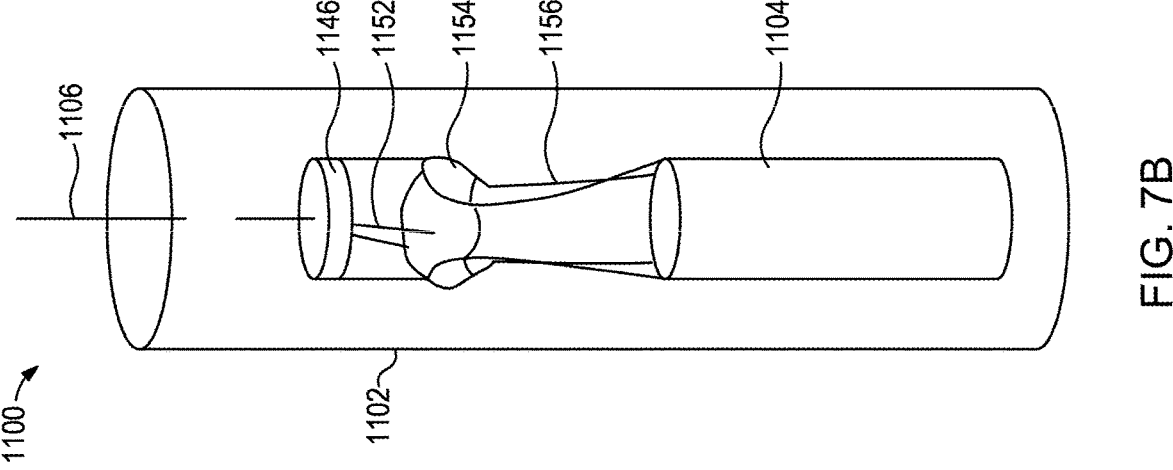
FIGS. 7A-7B are diagrams of various views of a portion of a potential energy conversion system incorporating a movable mass equipped with a parachute for protecting a well plug.
Figure 7A:
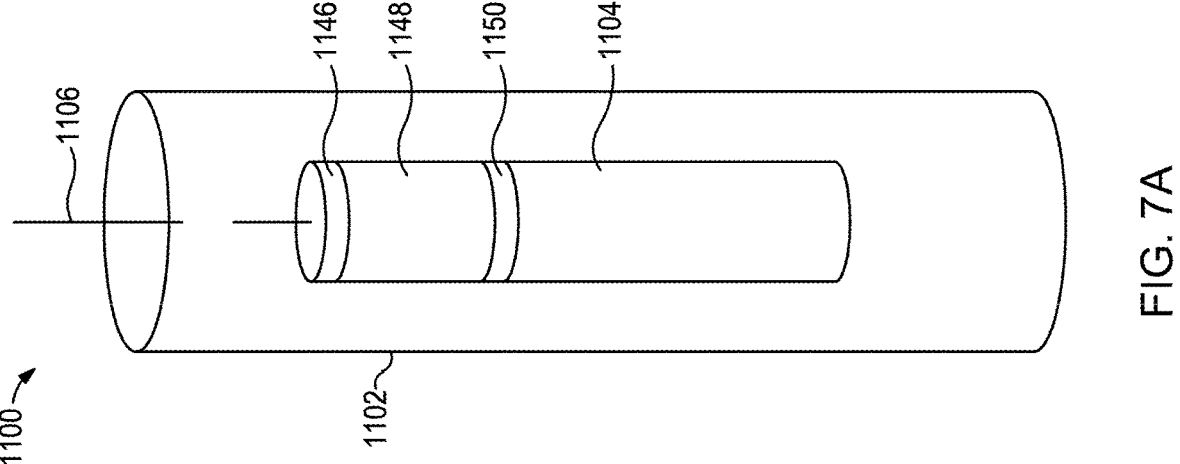

FIGS. 7A and 7B are various views of a portion of a potential energy conversion system 1100 incorporating a movable mass equipped with a parachute for protecting a plug of a well. Potential energy conversion system 1100 includes movable mass 1104 supported by line 1106 within an interval of well 1102. In this example, parachute 1154 is used to increase the diameter and fluid drag of movable mass 1104 during an uncontrolled fall. As shown in a non-deployed state in FIG. 7A, movable mass 1104 is equipped with parachute housing 1148 and cord housing 1150 for storage during routine operation. Connecting plate 1146 is affixed to parachute housing 1148, which is then used to secure the movable mass 1104 to line 1106. In the configuration shown in FIG. 7B, parachute 1154 has been deployed. Tension is applied from cords 1152 attaching connecting plate 1146 to parachute 1154. Cords 1156 connect parachute 1154 to movable mass 1104. Parachute 1154 may be dimensioned based on the diameter of well 1102, and may have a maximum diameter equivalent to the well diameter. Parachute 1154 may slow the descent of movable mass 1104 and, once movable mass 1104 reaches the bottom of well 1102, cords 1152 and 1156 and parachute 1154 may collapse on to movable mass 1104.

Figure 8B:
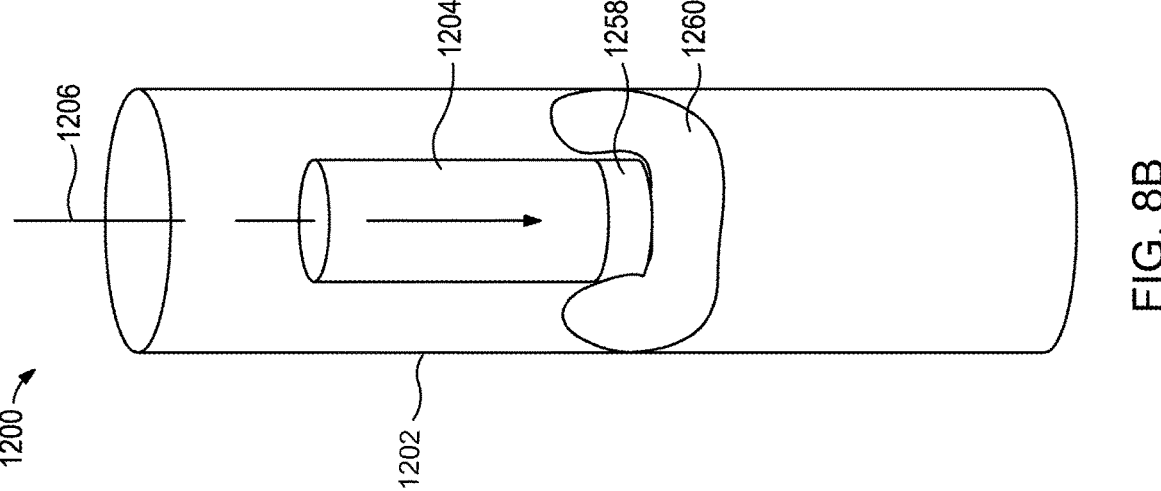
FIGS. 8A-8B are diagrams of various views of a portion of a potential energy conversion system incorporating a movable mass equipped with an inflatable structure for protecting a well plug.
Figure 8A:
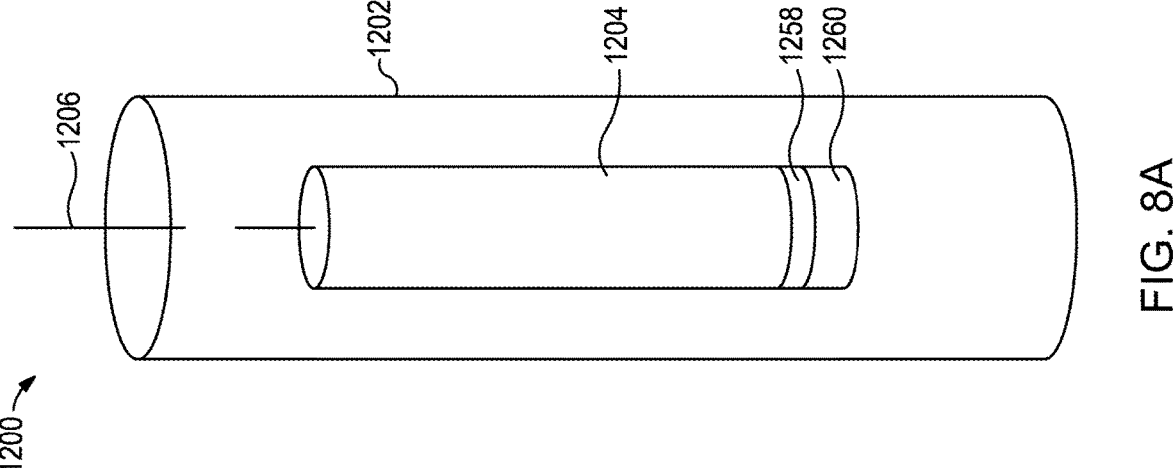

FIGS. 8A and 8B are various views of a portion of a potential energy conversion system 1200 incorporating a mass equipped with an inflatable structure for protecting a plug of a well. Potential energy conversion system 1200 includes movable mass 1204 supported by line 1206 within an interval of well 1202. In this example, inflatable structure 1260, such as an inflatable bag, is used to increase the diameter and fluid drag of movable mass 1204 during an uncontrolled fall. In the non-deployed state depicted in FIG. 8A, inflatable structure 1260 is arranged on movable mass 1204 and interposed by housing 1258 disposed over a pressure source capable of inflating inflatable structure 1260, such as a pressurized air vessel or gas generator. In FIG. 8B, inflatable structure 1260 is deployed and inflated by pressurized gas supplied from housing 1258. When deployed, inflatable structure 1260 may increase fluid drag force, friction force, and buoyant force exerted on movable mass 1204 as it descends in well 1202. Inflatable structure 1260, once deployed, may also provide a lifting force from the buoyancy of gas filling the inflatable structure 1260. As inflatable structure 1260 expands, it may be dimensioned to contact with the walls of well 1202, thereby providing additional kinetic friction force to slow the descent of movable mass 1204. Inflatable structure 1260 may also cushion the impact and/or collapse upon contacting a plug within well 1202.

Potential energy storage systems disclosed herein may also include one or more sub-systems for promoting recovery of a mass located at the base of a well following line failure. FIGS. 9A-9E are various views of a recovery system and method for retrieving a mass from a well housing a potential energy conversion system in accordance with the present disclosure. As shown in FIG. 9A, movable mass 1304 equipped with fishing neck 1362 is shown resting at the base of well 1302. During retrieval, grapple tool 1364 is lowered into well 1302 by line 1366 and is secured to fishing neck 1362, as shown in FIG. 9B. Depending on the weight of movable mass 1304, line 1366 may be sufficient to withdraw movable mass 1304 from well 1302.

For heavier or lodged movable masses 1304, inflatable devices may be employed to aid lifting and removal. As shown in FIG. 9C, grapple tool 1364 may be released from support line 1362. Balloon housing 1368 may then be lowered on a capillary string 1370 and installed on a corresponding coupling 1372 extending from grapple tool 1364. To aid withdrawal of movable mass 1304, gas is injected by capillary string 1370 to inflate and release balloon 1374 from balloon housing 1368, as shown in FIG. 9D. Fully inflated balloon 1374 then creates positive buoyancy that may lift or substantially aid removal of movable mass 1304. In FIG. 9E, support line 1306 is re-attached to movable mass 1304 by a connection at the top of balloon 1374. Balloon 1374 then provides buoyant force that aids transport of movable mass 1304 to the surface.

Embodiments disclosed herein include:

A. Potential energy conversion systems having a fluid storage tank. The systems comprise: a movable mass suspended by a line in a non-producing well, the line being coupled to a motor operable to lift the movable mass and a generator operable to produce electricity when lowering the movable mass; a fluid filling at least a portion of the non-producing well, a volume of the fluid being sufficient to at least fully immerse the movable mass when the movable mass is raised to an uppermost position in the non-producing well; and a storage tank configured to receive fluid displaced from the non-producing well as the movable mass is lowered from a higher location to a lower location in the non-producing well and to return the fluid into the non-producing well as the movable mass is raised from the lower location in the non-producing well.

B. Potential energy conversion systems having one or more wellhead sensors. The systems comprise: a movable mass suspended by a line in a non-producing well, the line being coupled to a motor operable to lift the movable mass and a generator operable to produce electricity when lowering the movable mass; a wellhead sealing a surface opening of the non-producing well; wherein the line is coupled to a sheave pulley system located at a surface opening of the non-producing well; and at least one sensor operable to measure one or more fluid properties, gas properties, or any combination thereof within the non-producing well; wherein the at least one sensor is located within the wellhead, upon the sheave pulley system, at a surface location proximate to the non-producing well, or any combination thereof.

C. Methods for retrofitting a non-producing well. The methods comprise: providing the potential energy conversion system of A or B; installing the potential energy conversion system into an interval of a non-producing well; and capping the non-producing well after installing the potential energy conversion system therein.

D. Methods for storing potential energy in a well. The methods comprise: providing the potential energy conversion system of A or B; and storing potential energy by raising the movable mass, or releasing potential energy and converting the potential energy to electricity by lowering the movable mass.

Each of embodiments A-D may have one or more of the following additional elements in any combination:

Element 1: wherein the potential energy conversion system further comprises at least one sensor operable to measure one or more fluid properties, gas properties, or any combination thereof within the non-producing well.

Element 2: wherein the at least one sensor measures one or more quantities selected from the group consisting of pressure, density, redox potential, viscosity, hydrocarbon concentration, total dissolved solids, saline concentration, and any combination thereof.

Element 3: wherein the at least one sensor is located within at least one of the non-producing well, a wellhead sealing a surface opening of the non-producing well, the storage tank, a conduit leading from the non-producing well to the storage tank, or any combination thereof.

Element 4: wherein the line extends through a sheave pulley system located at a surface opening of the non-producing well.

Element 5: wherein the potential energy conversion system further comprises at least one sensor operable to measure one or more fluid properties, gas properties, or any combination thereof within the non-producing well, the at least one sensor being located upon the sheave pulley system.

Element 6: wherein the non-producing well has an upper section, a lower section, and a plug isolating the upper section from the lower section, the movable mass being located in the upper section of the non-producing well.

Element 7: wherein the upper section of the wellbore is cased between a wellhead and the plug.

Element 8: wherein the upper section of the non-producing well is completely filled with the fluid.

Element 9: wherein the upper section of the non-producing well is substantially vertical.

Element 10: wherein the fluid is an aqueous fluid comprising one or more additives selected from the group consisting of a biocide, an anti-corrosion chemical, a scale inhibitor, a friction reducer, a rheology modifier, and any combination thereof.

Element 11: wherein the motor operates as the generator as the movable mass is lowered and the motor turns in reverse.

Element 12: wherein the potential energy conversion system further comprises one or more failsafe devices affixed to the movable mass or located upon a plug within the non-producing well.

Element 13: wherein the one or more failsafe devices are effective to perform one or more of increasing buoyancy, increasing drag, or increasing friction of the movable mass.

Element 14: wherein the potential energy conversion system further comprises a wellhead sealing a surface opening of the well; wherein the storage tank is connected to the wellhead and the wellhead is configured to receive the fluid as the fluid is displaced from the well.

Element 15: wherein the method further comprises installing the plug in the non-producing well prior to installing the potential energy conversion system.

Element 16: wherein the non-producing well has an upper section and a lower section divided by a plug isolating the upper section from the lower section; wherein the movable mass is located within the upper section and is movable therein.

Element 17: wherein the method further comprises introducing the fluid into the non-producing well.

Element 18: wherein the potential energy conversion system further comprises: at least one sensor operable to measure one or more fluid properties, gas properties, or any combination thereof within the non-producing well, the method further comprising: measuring at least one of the one or more fluid properties, gas properties, or any combination thereof.

Element 19: wherein a storage tank is connected to the wellhead and configured to receive a portion of the fluid from the well as the movable mass is lowered in the well.

By way of non-limiting example, exemplary combinations applicable to A and D include, but are not limited to, 1 and 2; 1 and 3; 1 and 6; 1 and 8; 1 and 10; 1 and 14; 6 and 7; 6 and 8; and 6 and 10. Any of the foregoing are applicable to B and C.

Additional embodiments disclosed herein include:

Embodiment 1. A potential energy conversion system comprising:

a movable mass suspended by a line in a non-producing well, the line being coupled to a motor operable to lift the movable mass and a generator operable to produce electricity when lowering the movable mass;

a fluid filling at least a portion of the non-producing well, a volume of the fluid being sufficient to immerse the movable mass when the movable mass is raised to an uppermost position in the non-producing well; and a storage tank configured to receive fluid displaced from the non-producing well as the movable mass is lowered to from a higher location to a lower location in the non-producing well and to return the fluid into the non-producing well as the movable mass is raised from the lower location in the non-producing well.

Embodiment 2. The potential energy conversion system of Embodiment 1, further comprising:

at least one sensor;

wherein the at least one sensor is operable to provide information about a condition in the non-producing well, an operational status of the potential energy conversion system, or any combination thereof.

Embodiment 3. The potential energy conversion system of Embodiment 2, wherein the at least one sensor is operable to measure one or more fluid properties, gas properties, mechanical properties, or any combination thereof within the non-producing well.

Embodiment 3A. The potential energy conversion system of Embodiment 2, wherein the at least one sensor is operable to measure one or more fluid properties, gas properties, or any combination thereof within the non-producing well Embodiment 4. The potential energy conversion system of Embodiment 3, wherein the at least one sensor is located within at least one of the non-producing well, a wellhead sealing a surface opening of the non-producing well, the storage tank, a conduit leading from the non-producing well to the storage tank, upon a sheave pulley system located at a surface opening of the non-producing well, a surface location proximate to the non-producing well, or any combination thereof.

Embodiment 5. The potential energy conversion system of Embodiment 1, wherein the line extends through a sheave pulley system located at a surface opening of the non-producing well.

Embodiment 6. The potential energy conversion system of Embodiment 1, wherein the non-producing well has an upper section, a lower section, and a plug isolating the upper section from the lower section, the movable mass being located in the upper section of the non-producing well.

Embodiment 7. The potential energy conversion system of Embodiment 1, wherein the fluid is an aqueous fluid comprising one or more additives selected from the group consisting of a biocide, an anti-corrosion chemical, a scale inhibitor, a friction reducer, a rheology modifier, and any combination thereof.

Embodiment 8. The potential energy conversion system of Embodiment 1, wherein the motor operates as the generator as the movable mass is lowered and the motor turns in reverse.

Embodiment 9. The potential energy conversion system of Embodiment 1, further comprising:

a wellhead sealing a surface opening of the non-producing well;

wherein the storage tank is connected to the wellhead and the wellhead is configured to receive the fluid as the fluid is displaced from the non-producing well.

Embodiment 10. The potential energy conversion system of Embodiment 1, wherein the movable mass is fully immersed in the fluid and/or the wellbore is completely filled with the fluid.

Embodiment 11. A method for retrofitting a well, comprising:

providing the potential energy conversion system of Embodiment 1;

installing the potential energy conversion system into an interval of the non-producing well; and capping the non-producing well after installing the potential energy conversion system therein.

Embodiment 12. The method of Embodiment 11, wherein the non-producing well has an upper section, a lower section, and a plug isolating the upper section from the lower section;

wherein the movable mass is located within the upper section and is movable therein.

Embodiment 13. The method of Embodiment 12, further comprising:

installing the plug in the non-producing well prior to installing the potential energy conversion system.

Embodiment 14. The method of Embodiment 13, further comprising:

introducing the fluid into the non-producing well.

Embodiment 15. The method of Embodiment 14, wherein the potential energy conversion system further comprises at least one sensor;

wherein the at least one sensor is operable to provide information about a condition in the non-producing well, an operational status of the potential energy conversion system, or any combination thereof.

Embodiment 16. The method of Embodiment 15, wherein the at least one sensor is operable to measure one or more fluid properties, gas properties, mechanical properties, or any combination thereof within the non-producing well, the method further comprising: measuring at least one of the one or more fluid properties, gas properties, mechanical properties, or any combination thereof with the at least one sensor.

Embodiment 16A. The method of Embodiment 15, wherein the at least one sensor is operable to measure one or more fluid properties, gas properties, or any combination thereof within the non-producing well, the method further comprising:

measuring at least one of the one or more fluid properties, gas properties, or any combination thereof with the at least one sensor.

Embodiment 17. The method of Embodiment 14, wherein the fluid is an aqueous fluid comprising one or more additives selected from the group consisting of a biocide, an anti-corrosion chemical, a scale inhibitor, a friction reducer, a rheology modifier, and any combination thereof.

Embodiment 18. A method comprising:

providing the potential energy conversion system of Embodiment 1; and storing potential energy by raising the movable mass, or releasing potential energy and converting the potential energy to electricity by lowering the movable mass;

wherein the storage tank receives fluid displaced from the non-producing well as the movable mass is lowered and returns the fluid into the non-producing well as the movable mass is raised.

Embodiment 19. A potential energy conversion system comprising:

a movable mass suspended by a line in a non-producing well, the line being coupled to a motor operable to lift the movable mass and a generator operable to produce electricity when lowering the movable mass;

a wellhead sealing a surface opening of the non-producing well;

wherein the line transits the wellhead and is coupled to a sheave pulley system located at a surface opening of the non-producing well; and at least one sensor;

wherein the at least one sensor is operable to provide information about a condition in the non-producing well, an operational status of the potential energy conversion system, or any combination thereof; and wherein the at least one sensor is located within the wellhead, upon the sheave pulley system, at a surface location proximate to the non-producing well, or any combination thereof.

Embodiment 20. The potential energy conversion system of Embodiment 19, wherein the at least one sensor is operable to measure one or more fluid properties, gas properties, mechanical properties, or any combination thereof within the non-producing well.

Embodiment 20A. The potential energy conversion system of Embodiment 19, wherein the at least one sensor is operable to measure one or more fluid properties, gas properties, or any combination thereof within the non-producing well.

Embodiment 21. The potential energy conversion system of Embodiment 19, wherein the non-producing well has an upper section, a lower section, and a plug isolating the upper section from the lower section, the movable mass being located in the upper section of the non-producing well.

Embodiment 22. The potential energy conversion system of Embodiment 19, wherein a storage tank is connected to the wellhead and configured to receive a portion of the fluid from the non-producing well as the movable mass is lowered in the non-producing well.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A potential energy conversion system comprising:
   a movable mass suspended by a line in a non-producing well, the line being coupled to a motor operable to lift the movable mass and a generator operable to produce electricity when lowering the movable mass;
   a fluid filling at least a portion of the non-producing well, a volume of the fluid being sufficient to immerse the movable mass when the movable mass is raised to an uppermost position in the non-producing well; and
   a storage tank configured to receive fluid displaced from the non-producing well as the movable mass is lowered from a higher location to a lower location in the non-producing well and to return the fluid into the non-producing well as the movable mass is raised from the lower location in the non-producing well.

2. The potential energy conversion system of claim 1, further comprising:
   at least one sensor;
      wherein the at least one sensor is operable to provide information about a condition in the non-producing well, an operational status of the potential energy conversion system, or any combination thereof.

3. The potential energy conversion system of claim 2, wherein the at least one sensor is operable to measure one or more fluid properties, gas properties, mechanical properties, or any combination thereof within the non-producing well.

4. The potential energy conversion system of claim 3, wherein the at least one sensor is located within at least one of the non-producing well, a wellhead sealing a surface opening of the non-producing well, the storage tank, a conduit leading from the non-producing well to the storage tank, upon a sheave pulley system located at a surface opening of the non-producing well, a surface location proximate to the non-producing well, or any combination thereof.

5. The potential energy conversion system of claim 1, wherein the line extends through a sheave pulley system located at a surface opening of the non-producing well.

6. The potential energy conversion system of claim 1, wherein the non-producing well has an upper section, a lower section, and a plug isolating the upper section from the lower section, the movable mass being located in the upper section of the non-producing well.

7. The potential energy conversion system of claim 1, wherein the fluid is an aqueous fluid comprising one or more additives selected from the group consisting of a biocide, an anti-corrosion chemical, a scale inhibitor, a friction reducer, a rheology modifier, and any combination thereof.

8. The potential energy conversion system of claim 1, wherein the motor operates as the generator as the movable mass is lowered and the motor turns in reverse.

9. The potential energy conversion system of claim 1, further comprising:

a wellhead sealing a surface opening of the non-producing well;

wherein the storage tank is connected to the wellhead and the wellhead is configured to receive the fluid as the fluid is displaced from the non-producing well.

10. The potential energy conversion system of claim 1, wherein the movable mass is fully immersed in the fluid and/or the wellbore is completely filled with the fluid.

11. A method for retrofitting a well, comprising:

providing the potential energy conversion system of claim 1;

installing the potential energy conversion system into an interval of the non-producing well; and capping the non-producing well after installing the potential energy conversion system therein.

12. The method of claim 11, wherein the non-producing well has an upper section, a lower section, and a plug isolating the upper section from the lower section;

wherein the movable mass is located within the upper section and is movable therein.

13. The method of claim 12, further comprising:

installing the plug in the non-producing well prior to installing the potential energy conversion system.

14. The method of claim 13, further comprising:

introducing the fluid into the non-producing well.

15. The method of claim 14, wherein the potential energy conversion system further comprises at least one sensor;

wherein the at least one sensor is operable to provide information about a condition in the non-producing well, an operational status of the potential energy conversion system, or any combination thereof.

16. The method of claim 15, wherein the at least one sensor is operable to measure one or more fluid properties, gas properties, mechanical properties, or any combination thereof within the non-producing well, the method further comprising:

measuring at least one of the one or more fluid properties, gas properties, mechanical properties, or any combination thereof with the at least one sensor.

17. The method of claim 14, wherein the fluid is an aqueous fluid comprising one or more additives selected from the group consisting of a biocide, an anti-corrosion chemical, a scale inhibitor, a friction reducer, a rheology modifier, and any combination thereof.

18. A method comprising:

providing the potential energy conversion system of claim 1; and storing potential energy by raising the movable mass, or releasing potential energy and converting the potential energy to electricity by lowering the movable mass;

wherein the storage tank receives fluid displaced from the non-producing well as the movable mass is lowered and returns the fluid into the non-producing well as the movable mass is raised.

19. A potential energy conversion system comprising:

a movable mass suspended by a line in a non-producing well, the line being coupled to a motor operable to lift the movable mass and a generator operable to produce electricity when lowering the movable mass;

a fluid filling at least a portion of the non-producing well, a volume of the fluid being sufficient to immerse the movable mass when the movable mass is raised to an uppermost position in the non-producing well;

a storage tank connected to the wellhead and configured to receive a portion of the fluid from the non-producing well as the movable mass is lowered in the non-producing well;

a wellhead sealing a surface opening of the non-producing well;

wherein the line transits the wellhead and is coupled to a sheave pulley system located at a surface opening of the non-producing well; and at least one sensor;

wherein the at least one sensor is operable to provide information about a condition in the non-producing well, an operational status of the potential energy conversion system, or any combination thereof; and wherein the at least one sensor is located within the wellhead, upon the sheave pulley system, at a surface location proximate to the non-producing well, or any combination thereof.

20. The potential energy conversion system of claim 19, wherein the at least one sensor is operable to measure one or more fluid properties, gas properties, mechanical properties, or any combination thereof within the non-producing well.

21. The potential energy conversion system of claim 19, wherein the non-producing well has an upper section, a lower section, and a plug isolating the upper section from the lower section, the movable mass being located in the upper section of the non-producing well.

* * * * *